US012628001B2

(12) United States Patent
Wu et al.

(10) Patent No.: US 12,628,001 B2
(45) Date of Patent: May 12, 2026

(54) METHOD AND DEVICE FOR AVOIDING MISMATCH BETWEEN A SPATIAL STATE AND CONFIGURATION INFORMATION OF A BEAM IN WIRELESS COMMUNICATION

(71) Applicant: Apogee 5G Global, LLC, Plano, TX (US)

(72) Inventors: Keying Wu, Shanghai (CN); Xiaobo Zhang, Shanghai (CN)

(73) Assignee: Apogee 5G Global, LLC, Plano, TX (US)

( * ) Notice: Subject to any disclaimer, the term of this patent is extended or adjusted under 35 U.S.C. 154(b) by 753 days.

(21) Appl. No.: 17/741,484

(22) Filed: May 11, 2022

(65) Prior Publication Data

US 2022/0369126 A1 Nov. 17, 2022

(30) Foreign Application Priority Data

May 12, 2021 (CN) .......................... 202110517403.3

(51) Int. Cl.
*H04W 16/28* (2009.01)
*H04L 1/1812* (2023.01)
(Continued)

(52) U.S. Cl.
CPC ........... *H04W 16/28* (2013.01); *H04L 1/1812* (2013.01); *H04L 5/0051* (2013.01);
(Continued)

(58) Field of Classification Search
CPC ............... H04W 16/28; H04W 72/542; H04W 72/0446; H04W 72/0453; H04W 72/1263;
(Continued)

(56) References Cited

U.S. PATENT DOCUMENTS 11,743,927 B2 8/2023 Wu et al.
2019/0174466 A1 6/2019 Zhang et al.
(Continued)

FOREIGN PATENT DOCUMENTS

WO 2021043105 A1 3/2021
WO 2021082933 A1 5/2021

OTHER PUBLICATIONS

Third Generation Partnership Project, "Technical Specification Group Radio Access Network; NR; Physical channels and modulation (Release 16)," 3GPP TS 38.211 V16.5.0 (Mar. 2021).
(Continued)

*Primary Examiner* — Ian N Moore
*Assistant Examiner* — Latresa A McCallum
(74) *Attorney, Agent, or Firm* — Volpe Koenig

(57) ABSTRACT

Method and Device in nodes for wireless communication. A first node receives a first configuration information block, a first signaling and a first reference signal resource. The first configuration information block comprises configuration information of the first reference signal resource; the first signaling indicates a first transmission configuration state; the first configuration information block is used to determine a first transmission configuration state set; the first signaling is used to determine a first time; a second transmission configuration state is used to determine a spatial relation of the first reference signal resource before the first time; a spatial relation of the first reference signal resource is related to whether the first transmission configuration state belongs to the first transmission configuration state set after the first time. The above method ensures that when the beam is dynamically updated, a TCI state of a reference signal constantly matches its configuration information.

20 Claims, 5 Drawing Sheets

(51) Int. Cl.

| | |
|---|---|
| *H04L 5/00* | (2006.01) |
| *H04W 72/0446* | (2023.01) |
| *H04W 72/0453* | (2023.01) |
| *H04W 72/1263* | (2023.01) |
| *H04W 72/542* | (2023.01) |

(52) U.S. Cl.

CPC ....... *H04L 5/0053* (2013.01); *H04W 72/0446* (2013.01); *H04W 72/0453* (2013.01); *H04W 72/1263* (2013.01); *H04W 72/542* (2023.01)

(58) Field of Classification Search

CPC .............. H04W 72/231; H04W 72/232; H04L 1/1812; H04L 5/0051; H04L 5/0053; H04L 1/1854; H04L 5/0023; H04L 5/0028; H04L 5/0048; H04L 5/0087; H04L 5/0091; H04L 5/0055; H04B 7/0456; H04B 7/0695

See application file for complete search history.

(56) References Cited

U.S. PATENT DOCUMENTS

| | | | | |
|---|---|---|---|---|
| 2021/0337584 A1* | 10/2021 | Zhang | ................... | H04W 72/23 |
| 2022/0295494 A1* | 9/2022 | Song | .................... | H04L 5/0051 |
| 2023/0156487 A1* | 5/2023 | Wu | ........................ | H04L 5/0053 |
| | | | | 370/329 |
| 2024/0097850 A1* | 3/2024 | Zhou | .................. | H04B 7/06968 |
| 2024/0259161 A1* | 8/2024 | Gao | ........................ | H04W 76/27 |

OTHER PUBLICATIONS

Third Generation Partnership Project, "Technical Specification Group Radio Access Network; NR; Multiplexing and channel coding (Release 16)," 3GPP TS 38.212 V16.5.0 (Mar. 2021).

Third Generation Partnership Project, "Technical Specification Group Radio Access Network; NR; Physical layer procedures for control (Release 16)," 3GPP TS 38.213 V16.5.0 (Mar. 2021).

Third Generation Partnership Project, "Technical Specification Group Radio Access Network; NR; Physical layer procedures for data (Release 16)," 3GPP TS 38.214 V16.5.0 (Mar. 2021).

Third Generation Partnership Project, "Technical Specification Group Radio Access Network; NR; Medium Access Control (MAC) protocol specification (Release 16)," 3GPP TS 38.321 V16.4.0 (Mar. 2021).

Third Generation Partnership Project, "Technical Specification Group Radio Access Network; NR; Radio Resource Control (RRC) protocol specification (Release 16)," 3GPP TS 38.331 V16.4.1 (Mar. 2021).

* cited by examiner

100

First node

Receiving first configuration information block — 101

Receiving first signaling — 102

Receiving first reference signal resource — 103

5GS/EPS 200

HSS/UDM — 220

NG-RAN
202

UE — 201

NR Node B — 203

Other NR Nodes B — 204

UE — 241

MME/AMF /SMF — 211

Other MMEs/AMFs/SMFs — 214

S-GW/UPF — 212

P-GW/UPF — 213

Internet Service — 230

5GC/EPC
210

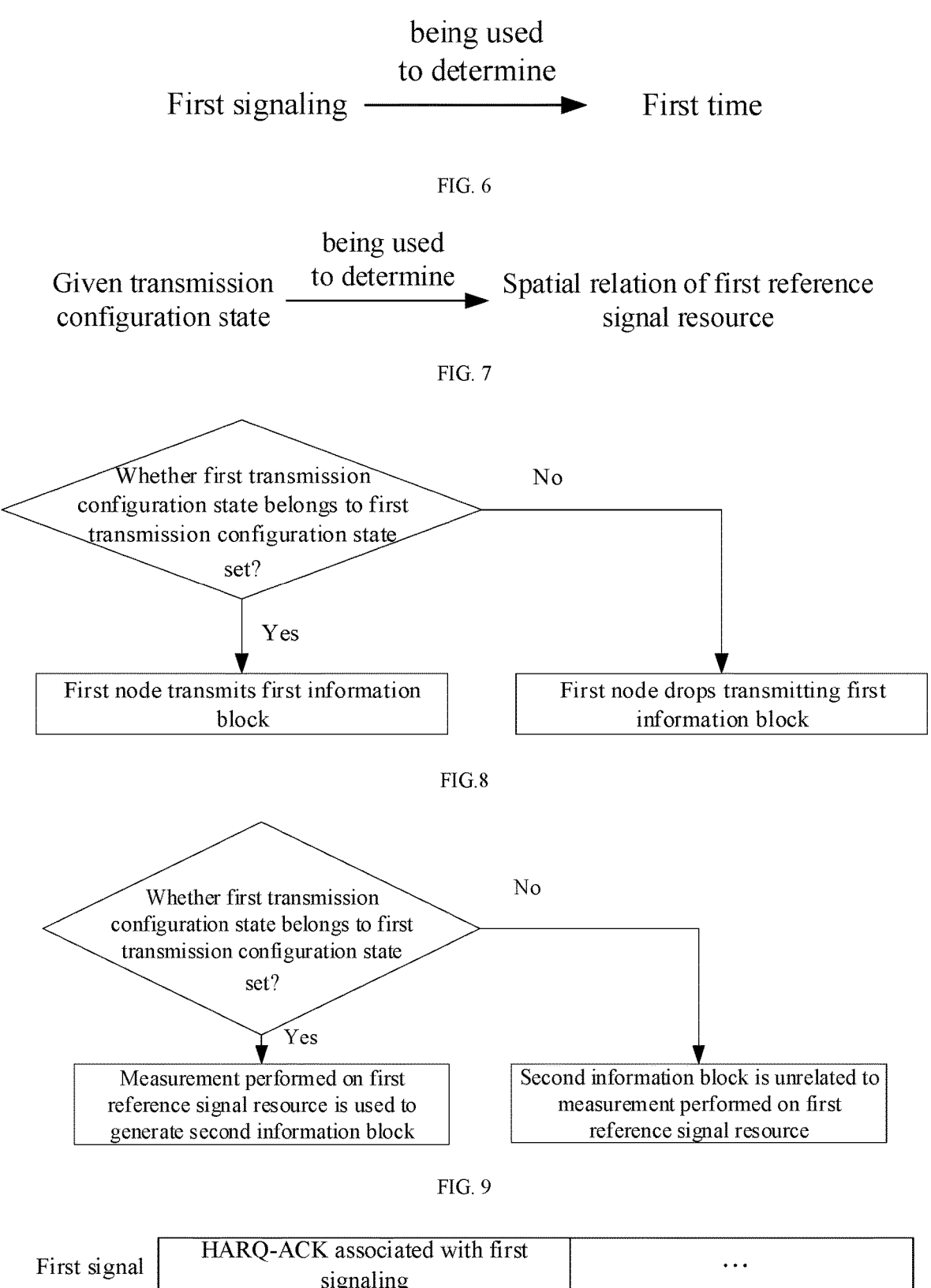

First signaling $\xrightarrow[\text{to determine}]{\text{being used}}$ First time

FIG. 6

Given transmission configuration state $\xrightarrow[\text{to determine}]{\text{being used}}$ Spatial relation of first reference signal resource

FIG. 7

Whether first transmission configuration state belongs to first transmission configuration state set?

No

Yes

First node transmits first information block

First node drops transmitting first information block

FIG.8

Whether first transmission configuration state belongs to first transmission configuration state set?

No

Yes

Measurement performed on first reference signal resource is used to generate second information block Second information block is unrelated to measurement performed on first reference signal resource

FIG. 9

First signal | HARQ-ACK associated with first signaling | . . .

FIG. 10

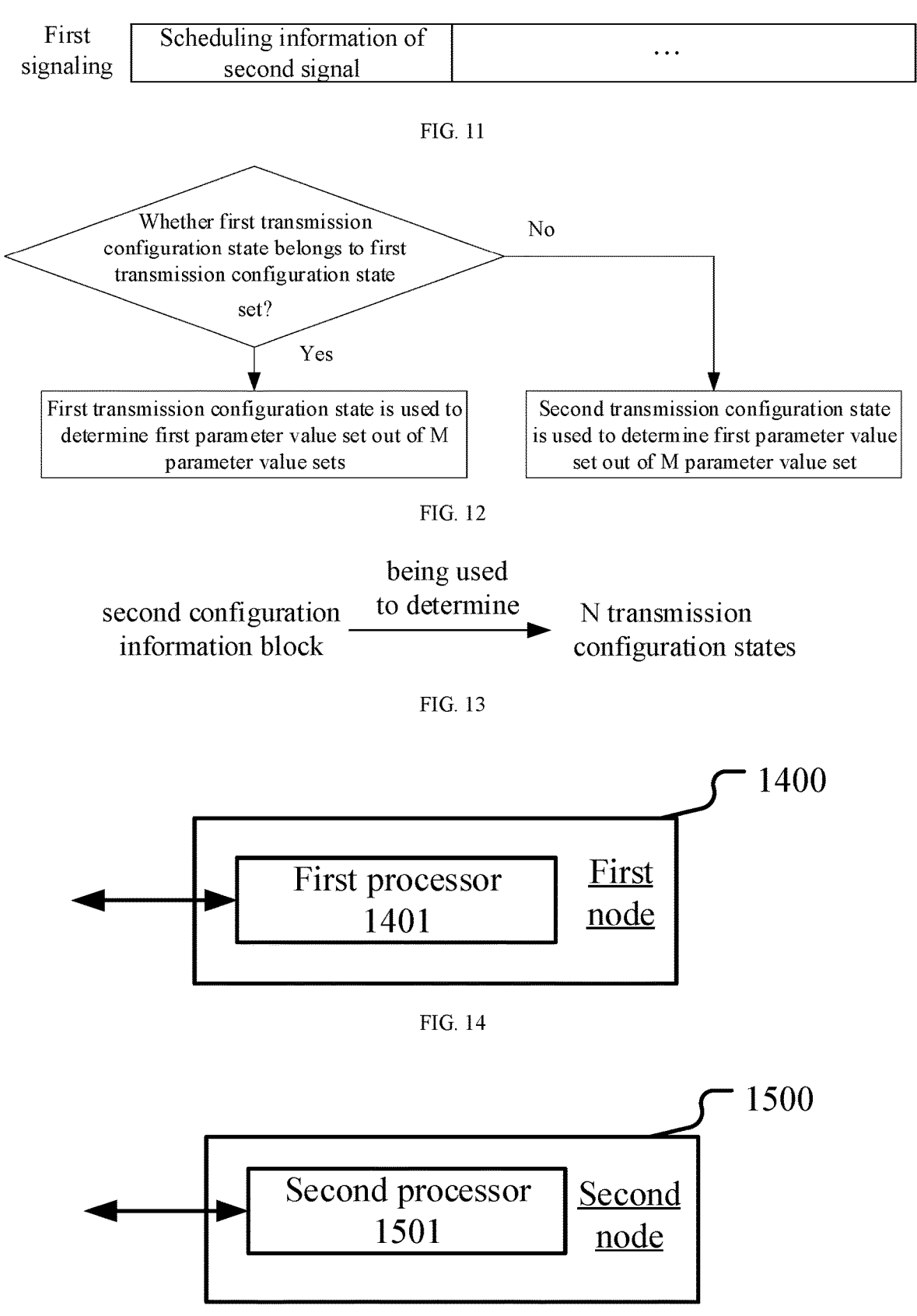

| First signaling | Scheduling information of second signal | ... |
|---|---|---|

FIG. 11

Whether first transmission configuration state belongs to first transmission configuration state set?

No

Yes

First transmission configuration state is used to determine first parameter value set out of M parameter value sets Second transmission configuration state is used to determine first parameter value set out of M parameter value set

FIG. 12 second configuration information block being used to determine

N transmission configuration states

FIG. 13

First processor 1401

First node

Second processor 1501

Second node

METHOD AND DEVICE FOR AVOIDING MISMATCH BETWEEN A SPATIAL STATE AND CONFIGURATION INFORMATION OF A BEAM IN WIRELESS COMMUNICATION

CROSS REFERENCE TO RELATED APPLICATIONS

This application claims the priority benefit of Chinese Patent Application No. 202110517403.3, filed on May 12, 2021, the full disclosure of which is incorporated herein by reference.

BACKGROUND

Technical Field

The present disclosure relates to transmission methods and devices in wireless communication systems, and in particular to a transmission method and device of a radio signal in a wireless communication system supporting cellular networks.

Related Art

Multi-antenna technology is a key technique in both 3rd Generation Partner Project (3GPP) Long-term Evolution (LIE) system and New Radio (NR) system. By configuring multiple antennas at a communication node, for instance, at a base station or a User Equipment (UE) to acquire extra spatial degrees of freedom. The multiple antennas form through beamforming a beam pointing in a specific direction to improve communication quality. Since the beam formed through beamforming of multiple antennas is usually narrow, beams from both sides of communication shall be aligned to enable effective communication. When out-of-step between transmission/reception beams is incurred by UE movement or other factors, the communications will face a large decline in quality or even communication failure. Therefore, beam management is proposed in NR Release (R) 15 and R16 for beam selection, updating and indication between two communication sides, thus achieving performance gains brought by multi-antenna.

In NR R15 and R16, a control channel and a data channel adopt different beam management/indication mechanisms, and uplink and downlink also adopt different beam management/indication mechanisms. However, in many cases, the control channel and the data channel can adopt a same beam, and there is channel reciprocity between uplink and downlink channels in many application scenarios, so a same beam can be used. Using this feature can greatly reduce the system complexity, signaling overhead and delay. In 3GPP Radio Access Network (RAN) 1 #103e meeting, the technology of using a physical layer signaling to update beams of the control channel and data channel at the same time has been adopted, and in the scenario where reciprocity exists in uplink and downlink channels, the uplink and downlink beams can be updated simultaneously with a physical layer signaling. At 3GPP RANI #103e meeting, the proposal of using a downlink grant Downlink control information (DCI) for uplink/downlink beam update was approved.

SUMMARY

Inventors have found through researches that if a downlink beam indicated by a DCI is not only applicable to a downlink data channel and a downlink control channel, but is also applicable to (part of) a downlink reference signal, and a spatial state of the downlink reference signal will be dynamically updated. Considering that configuration information of the downlink reference signal, comprising time-frequency resources, density and a number of reference signal ports, is semi-statically configured in the existing standards, how to avoid the mismatch between the dynamically indicated spatial state and the semi-statically configured configuration information is a problem to be solved.

To address the above problem, the present disclosure provides a solution. It should be noted that although the above description takes cellular network and downlink reference signal as an example, the application is also applicable to other scenarios, such as Vehicle-to-Everything (V2X), sidelink transmission and other reference signals, where similar technical effects can also be achieved. Additionally, the adoption of a unified solution for various scenarios, including but not limited to cellular network, V2X, sidelink transmission, downlink reference signal and other reference signals, contributes to the reduction of hardcore complexity and costs. If no conflict is incurred, embodiments in a first node in the present disclosure and the characteristics of the embodiments can also be applicable to a second node, and vice versa. And the embodiments in the present disclosure and the characteristics in the embodiments can be arbitrarily combined if there is no conflict.

In one embodiment, interpretations of the terminology in the present disclosure refer to definitions given in the 3GPP TS36 series.

In one embodiment, interpretations of the terminology in the present disclosure refer to definitions given in the 3GPP TS38 series.

In one embodiment, interpretations of the terminology in the present disclosure refer to definitions given in the 3GPP TS37 series.

In one embodiment, interpretations of the terminology in the present disclosure refer to definitions given in Institute of Electrical and Electronics Engineers (IEEE) protocol specifications.

The present disclosure provides a method in a first node for wireless communications, comprising:

receiving a first configuration information block, the first configuration information block comprising configuration information of a first reference signal resource;

receiving a first signaling, the first signaling indicating a first transmission configuration state; and receiving the first reference signal resource;

herein, the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

In one embodiment, a problem to be solved in the present disclosure includes: how to avoid the mismatch between a dynamically indicated spatial state of a downlink reference signal and semi-statically configured configuration information.

In one embodiment, a problem to be solved in the present disclosure includes but is not limited to: configuration information of a downlink reference signal (including but not limited to density and a number of reference signal ports) is for a Transmitter Receiver Point (TRP), but a spatial relation dynamically indicated by a DCI is for another TRP, and the two TRPs need different reference signal configuration information (including but not limited to different numbers of antennas configured by the two TRPs, resulting in the different numbers of required reference signal ports). Meanwhile, how to solve the mismatch between configuration information for the one TRP and a spatial relation for the another TRP.

In one embodiment, characteristics of the above method include: for a transmission configuration state set configured by a reference signal resource, only when a dynamically indicated transmission configuration state belongs to the transmission configuration state set, the dynamically indicated transmission configuration state can be used for the reference signal resource. The advantages of this include that a spatial state that can be adopted by the reference signal resource can be limited to ensure its constant match with configuration information.

According to one aspect of the present disclosure, comprising:

transmitting a first information block, or dropping transmitting the first information block;

herein, the first information block comprises a reporting for a first reporting configuration, and reference signal resources associated with the first reporting configuration comprise the first reference signal resource; whether the first node transmits the first information block is related to whether the first transmission configuration state belongs to the first transmission configuration state set; if the first transmission configuration state belongs to the first transmission configuration state set, the first node transmits the first information block; and if the first transmission configuration state does not belong to the first transmission configuration state set, the first node drops transmitting the first information block.

In one embodiment, advantages of the above method include: when and only when a reference signal resource associated with a CSI reporting configuration adopts a currently active TCI state, a CSI configured for the CSI reporting configuration is reported, which improves the efficiency of CSI feedback and saves CSI feedback overhead.

According to one aspect of the present disclosure, comprising:

transmitting a second information block, the second information block comprising a reporting for a second reporting configuration;

herein, reference signal resources associated with the second reporting configuration comprise the first reference signal resource, and whether a measurement performed on the first reference signal resource is used to generate the second information block is related to whether the first transmission configuration state belongs to the first transmission configuration state set; if the first transmission configuration state belongs to the first transmission configuration state set, the measurement performed on the first reference signal resource is used to generate the second information block; if the first transmission configuration state does not belong to the first transmission configuration state set, the second information block is unrelated to the measurement performed on the first reference signal resource.

In one embodiment, advantages of the above method include: it ensures that a CSI reported by a UE is obtained based on a currently active TCI state, which improves the effectiveness of CSI feedback and saves CSI feedback overhead.

According to one aspect of the present disclosure, comprising:

transmitting a first signal;

herein, the first signal carries a HARQ-ACK associated with the first signaling.

According to one aspect of the present disclosure, comprising:

receiving a second signal;

herein, the first signaling comprises scheduling information of the second signal.

According to one aspect of the present disclosure, it is characterized in that the first configuration information block indicates M reference value sets, M being a positive integer greater than 1; after the first time, a first parameter value set indicates at least one of frequency-domain resources, time-domain resources, density, period or a number of port(s) of the first reference signal resource; the first parameter value set is related to whether the first transmission configuration state belongs to the first transmission configuration state set; if the first transmission configuration state belongs to the first transmission configuration state set, the first transmission configuration state is used to determine the first parameter value set out of the M parameter value sets; and if the first transmission configuration state does not belong to the first transmission configuration state set, the second transmission configuration state is used to determine the first parameter value set out of the M parameter value sets.

According to one aspect of the present disclosure, comprising:

receiving a second configuration information block;

herein, the second configuration information block is used to determine N transmission configuration states, N being a positive integer greater than 1; the first signaling indicates the first transmission configuration state out of the N transmission configuration states.

According to one aspect of the present disclosure, it is characterized in that the first node is a UE.

According to one aspect of the present disclosure, it is characterized in that the first node is a relay node.

The present disclosure provides a method in a second node for wireless communications, comprising:

transmitting a first configuration information block, the first configuration information block comprising configuration information of a first reference signal resource;

transmitting a first signaling, the first signaling indicating a first transmission configuration state; and transmitting the first reference signal resource;

herein, the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

According to one aspect of the present disclosure, comprising:

receiving a first information block, or dropping receiving the first information block;

herein, the first information block comprises a reporting for a first reporting configuration, and reference signal resources associated with the first reporting configuration comprise the first reference signal resource; whether a transmitter of the first information block transmits the first information block is related to whether the first transmission configuration state belongs to the first transmission configuration state set; if the first transmission configuration state belongs to the first transmission configuration state set, the transmitter of the first information block transmits the first information block; and if the first transmission configuration state does not belong to the first transmission configuration state set, the transmitter of the first information block drops transmitting the first information block.

According to one aspect of the present disclosure, comprising:

receiving a second information block, the second information block comprising a reporting for a second reporting configuration;

herein, reference signal resources associated with the second reporting configuration comprise the first reference signal resource, and whether a measurement performed on the first reference signal resource is used to generate the second information block is related to whether the first transmission configuration state belongs to the first transmission configuration state set; if the first transmission configuration state belongs to the first transmission configuration state set, the measurement performed on the first reference signal resource is used to generate the second information block; and if the first transmission configuration state does not belong to the first transmission configuration state set, the second information block is unrelated to the measurement performed on the first reference signal resource.

According to one aspect of the present disclosure, comprising:

receiving a first signal;

herein, the first signal carries a HARQ-ACK associated with the first signaling.

According to one aspect of the present disclosure, comprising:

transmitting a second signal;

herein, the first signaling comprises scheduling information of the second signal.

According to one aspect of the present disclosure, it is characterized in that the first configuration information block indicates M reference value sets, M being a positive integer greater than 1; after the first time, a first parameter value set indicates at least one of frequency-domain resources, time-domain resources, density, period or a number of port(s) of the first reference signal resource; the first parameter value set is related to whether the first transmission configuration state belongs to the first transmission configuration state set; if the first transmission configuration state belongs to the first transmission configuration state set, the first transmission configuration state is used to determine the first parameter value set out of the M parameter value sets; and if the first transmission configuration state does not belong to the first transmission configuration state set, the second transmission configuration state is used to determine the first parameter value set out of the M parameter value sets.

According to one aspect of the present disclosure, comprising:

transmitting a second configuration information block;

herein, the second configuration information block is used to determine N transmission configuration states, N being a positive integer greater than 1; the first signaling indicates the first transmission configuration state out of the N transmission configuration states.

According to one aspect of the present disclosure, it is characterized in that the second node is a base station.

According to one aspect of the present disclosure, it is characterized in that the second node is a UE.

According to one aspect of the present disclosure, it is characterized in that the second node is a relay node.

The present disclosure provides a device in a first node for wireless communications, comprising:

a first processor, receiving a first configuration information block, the first configuration information block comprising configuration information of a first reference signal resource;

the first processor, receiving a first signaling, the first signaling indicating a first transmission configuration state; and the first processor, receiving the first reference signal resource;

herein, the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

The present disclosure provides a device in a second node for wireless communications, comprising:

a second processor, transmitting a first configuration information block, the first configuration information block comprising configuration information of a first reference signal resource;

the second processor, transmitting a first signaling, the first signaling indicating a first transmission configuration state; and the second processor, transmitting the first reference signal resource;

herein, the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

In one embodiment, the present disclosure has the following advantages over conventional schemes:

it is allowed to dynamically update a spatial state of (partial) downlink reference signals, which reduces the delay of beam switching;

it ensures that a spatial state of a reference signal resource constantly matches its configuration information (including but not limited to time-frequency resources, density and a number of reference signal port(s)).

BRIEF DESCRIPTION OF THE DRAWINGS

Other features, objects and advantages of the present disclosure will become more apparent from the detailed description of non-restrictive embodiments taken in conjunction with the following drawings:

FIG. 6 illustrates a schematic diagram of a first signaling being used to determine a first time according to one embodiment of the present disclosure;

FIG. 7 illustrates a schematic diagram of a given transmission configuration state being used to determine a spatial relation of a first reference signal resource according to one embodiment of the present disclosure;

FIG. 8 illustrates a schematic diagram of whether a first information block is transmitted according to one embodiment of the present disclosure;

FIG. 9 illustrates a schematic diagram of whether a measurement performed on a first reference signal resource is used to generate a second information block according to one embodiment of the present disclosure;

FIG. 10 illustrates a schematic diagram of a first signal according to one embodiment of the present disclosure;

FIG. 11 illustrates a schematic diagram of a first signaling and a second signal according to one embodiment of the present disclosure;

FIG. 12 illustrates a schematic diagram of a first parameter value set being related to whether a first transmission configuration state belongs to a first transmission configuration state set according to one embodiment of the present disclosure;

FIG. 13 illustrates a schematic diagram of a second configuration information block according to one embodiment of the present disclosure;

FIG. 14 illustrates a structure block diagram of a processing device in a first node according to one embodiment of the present disclosure;

FIG. 15 illustrates a structure block diagram of a processing device in a second node according to one embodiment of the present disclosure.

DESCRIPTION OF THE EMBODIMENTS

The technical scheme of the present disclosure is described below in further details in conjunction with the drawings. It should be noted that the embodiments of the present disclosure and the characteristics of the embodiments may be arbitrarily combined if no conflict is caused.

Embodiment 1

Figure 1:
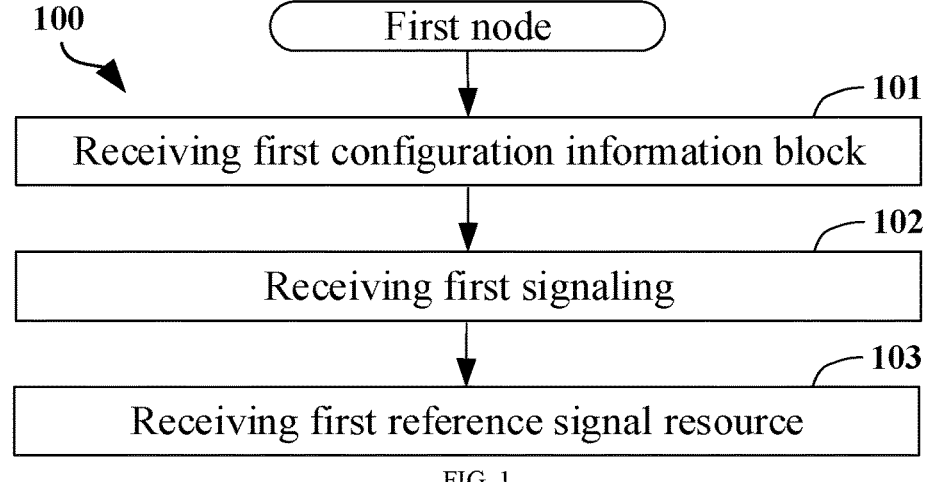
FIG. 1 illustrates a flowchart of a first signaling and a first reference signal according to one embodiment of the present disclosure.

Embodiment 1 illustrates a flowchart of a first signaling and a first reference signal according to one embodiment of the present disclosure, as shown in FIG. 1. In step 100 illustrated by FIG. 1, each box represents a step. and in particular, the order of steps in boxes does not represent chronological order of characteristics between the steps.

In embodiment 1, the first node in the present disclosure receives a first configuration information block in step 101, and the first configuration information block comprises configuration information of a first reference signal resource; receives a first signaling in step 102, the first signaling indicates a first transmission configuration state; and receives the first reference signal resource in step 103. Herein, the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

In one embodiment, if the first transmission configuration state belongs to the first transmission configuration state set, the first transmission configuration state is used to determine a spatial relation of the first reference signal resource after the first time; if the first transmission configuration state does not belong to the first transmission configuration state set, the second transmission state is used to determine a spatial relation of the first reference signal resource after the first time.

In one embodiment, when the first transmission configuration state belongs to the first transmission configuration state set, the first transmission state replaces the second transmission configuration state to be used to determine a spatial relation of the first reference signal resource after the first time; and when the first transmission configuration state does not belong to the first transmission configuration state set, the second transmission configuration state continues to be used to determine a spatial relation of the first reference signal resource after the first time.

In one embodiment, when the first transmission configuration state does not belong to the first transmission configuration state set, the first transmission configuration state is not used to determine a spatial relation of the first reference signal resource after the first time.

In one embodiment, the first configuration information block is carried by a higher-layer signaling.

In one embodiment, the first configuration information block is carried by a Radio Resource Control (RRC) signaling.

In one embodiment, the first configuration information block is carried by a Medium Access Control layer Control Element (MAC CE).

In one embodiment, the first configuration information block is carried by an RRC signaling and a MAC CE signaling together.

In one embodiment, the first configuration information block comprises information in all or partial fields in an Information Element (IE).

In one embodiment, the first configuration information block is an IE.

In one embodiment, the first configuration information block is carried by at least one IE.

In one embodiment, the first configuration information block is carried by an IE and a MAC CE together.

In one embodiment, the first configuration information block is carried by at least one IE and at least one MAC CE together.

In one embodiment, a name of an IE carrying the first configuration information block comprises "NZP-CSI-RS-Resource".

In one embodiment, a name of an IE carrying the first configuration information block comprises "NZP-CSI-RS-ResourceSet".

In one embodiment, a name of an IE carrying the first configuration information block comprises "CSI-RS-ResourceMapping".

In one embodiment, a name of an IE carrying the first configuration information block comprises "CSI-ReportConfig".

In one embodiment, a name of an IE carrying the first configuration information block comprises "CSI-MeasConfig".

In one embodiment, a name of an IE carrying the first configuration information block comprises "CSI-Aperiodic-TriggerStateList".

In one embodiment, a name of a MAC CE carrying the first configuration information block comprises "SP CSI-RS/CSI-IM Resource Set Activation/Deactivation".

In one embodiment, the first reference signal resource comprises a Channel State Information-Reference Signal (CSI-RS) resource.

In one embodiment, the first reference signal resource comprises a Non-Zero Power (NZP) CSI-RS resource.

In one embodiment, the first reference signal resource comprises a CSI-RS resource set.

In one embodiment, the first reference signal resource comprises an NZP CSI-RS resource set.

In one embodiment, the first reference signal resource comprises a Phase-Tracking Reference Signal (PTRS).

In one embodiment, the first reference signal resource comprises a Tracking Reference Signal (TRS).

In one embodiment, the first reference signal resource comprises a Positioning Reference Signal (PRS).

In one embodiment, the first reference signal resource is periodic.

In one embodiment, the first reference signal resource is aperiodic.

In one embodiment, the first reference signal resource is semi-persistent.

In one embodiment, the first reference signal resource occurs multiple times in time domain.

In one embodiment, the first reference signal resource occurs multiple times in time domain; one part of the multiple occurrences is earlier than the first time, and the other part of the multiple occurrences is later than the first time.

In one embodiment, the first reference signal resource occurs multiple times at equal intervals in time domain.

In one embodiment, the first reference signal resource occurs multiple times at unequal intervals in time domain.

In one embodiment, the first reference signal resource occurs only once in time domain.

In one embodiment, the first reference signal resource comprises a plurality of CSI-RS resources; the meaning of the phrase of a given transmission configuration state being used to determine a spatial relation of the first reference signal resource includes: the given transmission configuration state is used to determine a spatial relation of each CSI-RS resource in the first reference signal resource; and the given transmission configuration state is the first transmission configuration state or the second transmission configuration state.

In one embodiment, the first reference signal resource is identified by a first identity (ID), and the first ID is a non-negative integer.

In one embodiment, the first ID is an NZP-CSI-RS-ResourceId.

In one embodiment, the first ID is an NZP-CSI-RS-ResourceSetId.

In one embodiment, the first ID is a non-negative integer not greater than 200.

In one embodiment, the first ID is a non-negative integer not greater than 191.

In one embodiment, the first ID is a non-negative integer not greater than 63.

In one embodiment, the first reference signal resource comprises at least one reference signal port.

In one subembodiment of the above embodiment, the reference signal port comprises a CSI-RS port.

In one subembodiment of the above embodiment, the reference signal port is a CSI-RS port.

In one embodiment, the first reference signal resource is not configured with a higher-layer parameter "repetition".

In one embodiment, the first reference signal resource is configured with a higher-layer parameter "repetition" set to "on".

In one embodiment, the first reference signal resource is not configured with a higher-layer parameter "repetition", or is configured with a higher-layer parameter "repetition" set to "on".

In one embodiment, the first reference signal resource is not configured with a higher-layer parameter "trs-Info".

In one embodiment, the first reference signal resource is configured with a higher-layer parameter "trs-Info".

In one embodiment, a value of a higher-layer parameter "reportQuantity" associated with any CSI reporting configuration associated with the first reference signal resource belongs to a first higher-layer parameter value set.

In one embodiment, the first higher-layer parameter value set comprises "cri-RI-il", "cri-RI-il-CQI", "cri-RI-CQI" and "cri-RI-LI-PMI-CQI".

In one embodiment, the first higher-layer parameter value set comprises "cri-RI-il", "cri-RI-il-CQI", "cri-RI-CQI", "cri-RI-LI-PMI-CQI" and "none".

In one embodiment, the first higher-layer parameter value set consists of "cri-RI-il", "cri-RI-il-CQI", "cri-RI-CQI" and "cri-RI-LI-PMI-CQI".

In one embodiment, the first higher-layer parameter value set consists of "cri-RI-il", "cri-RI-il-CQI", "cri-RI-CQI", "cri-RI-LI-PMI-CQI" and "none".

In one embodiment, the first higher-layer parameter value set does not comprise "cri-RSRP" and "cri-SINR".

In one embodiment, if a higher-layer parameter "resourcesForChannelMeasurement" of a CSI reporting configuration indicates a reference signal resource, the reference signal resource is associated with the CSI reporting configuration.

In one embodiment, if a first-type higher-layer parameter of a CSI reporting configuration indicates a reference signal resource, the reference signal resource is associated with the CSI reporting configuration; a name of the first-type higher-layer parameter comprises "resourcesForChannelMeasurement".

In one embodiment, the configuration information of the first reference signal resource comprises part or all of time-domain resources, frequency-domain resources, a Code Division Multiplexing (CDM) type, a CDM group, scrambling, period, Quasi Co-Location (QCL) relation, density, or number of port(s).

In one embodiment, the first configuration information block explicitly indicates the configuration information of the first reference signal resource.

In one embodiment, the first configuration information block explicitly indicates a part of the configuration information of the first reference signal resource, and implicitly indicates the other part of the configuration information of the first reference signal resource.

In one embodiment, the meaning of the phrase of receiving the first reference signal resource includes: receiving a reference signal transmitted in the first reference signal resource.

In one embodiment, the meaning of the phrase of receiving the first reference signal resource includes: receiving a reference signal corresponding to the first reference signal resource.

In one embodiment, the meaning of the phrase of receiving the first reference signal resource includes: receiving a reference signal transmitted according to configuration information of the first reference signal resource.

In one embodiment, the transmission configuration state refers to a Transmission Configuration Indicator (TCI) state.

In one embodiment, the transmission configuration state indicates a QCL relation.

In one embodiment, the transmission configuration state comprises parameters for configuring a QCL relation between one or two reference signals and a DMRS prot of a physical signal and a physical layer data channel, a DMRS port of a physical layer control channel or a reference signal port of a reference signal resource.

In one subembodiment of the above embodiment, the physical layer data channel comprises a Physical Downlink Shared CHannel (PDSCH).

In one subembodiment of the above embodiment, the physical layer data channel comprises a Physical Uplink Shared CHannel (PUSCH).

In one subembodiment of the above embodiment, the physical layer control channel comprises a Physical Downlink Control Channel (PDCCH).

In one subembodiment of the above embodiment, the physical layer control channel comprises a Physical Uplink Control Channel (PUCCH).

In one subembodiment of the above embodiment, the reference signal resource comprises a CSI-RS resource.

In one subembodiment of the above embodiment, the reference signal port comprises a CSI-RS port.

In one subembodiment of the above embodiment, the reference signal resource comprises a Sounding Reference Signal (SRS) resource.

In one subembodiment of the above embodiment, the reference signal port comprises an SRS port.

In one embodiment, any transmission configuration state in the first transmission configuration state set is a TCI state.

In one embodiment, any transmission configuration state in the first transmission configuration state set indicates a QCL relation.

In one embodiment, the first transmission configuration state set only comprises one transmission configuration state.

In one embodiment, the first transmission configuration state set comprises more than one transmission configuration state.

In one embodiment, a number of transmission configuration state(s) comprised in the first transmission configuration state set is not greater than 8.

In one embodiment, a number of transmission configuration state(s) comprised in the first transmission configuration state set is not greater than 64.

In one embodiment, all transmission configuration states comprised in the first transmission configuration state set are for a same BandWidth Part (BWP).

In one embodiment, any transmission configuration state comprised in the first transmission configuration state set, the first transmission configuration state and the second transmission configuration state, are both for a same BWP.

In one embodiment, the first transmission configuration state and the second transmission configuration state are for a same BWP.

In one embodiment, the first configuration information block explicitly indicates the first transmission configuration state set.

In one embodiment, the first configuration information block indicates each transmission configuration state in the first transmission configuration state set.

In one embodiment, the first configuration information block indicates an ID of each transmission configuration state in the first transmission configuration state set.

In one embodiment, an ID of the transmission configuration state is a TCI-StateId.

In one embodiment, an ID of the transmission configuration state is a non-negative integer.

In one embodiment, an ID of the transmission configuration state is a non-negative integer not greater than 63.

In one embodiment, the first configuration information block implicitly indicates the first transmission configuration state set.

In one embodiment, one the transmission configuration state corresponds to a first-type index, and the first-type index is used to identify a cell associated with a reference signal resource indicated by a corresponding transmission configuration state.

In one embodiment, the first-type index is used to identify a cell.

In one embodiment, the first-type index is a non-negative integer.

In one embodiment, the first-type index comprises a Physical Cell ID (PCI).

In one embodiment, the first-type index is a PCI.

In one embodiment, the first-type index comprises a CellIdentity.

In one embodiment, the first-type index comprises an SCellIndex.

In one embodiment, the SCellIndex is a positive integer not greater than 31.

In one embodiment, the first-type index comprises an ServCellIndex.

In one embodiment, the ServCellIndex is non-negative integer not greater than 31.

In one embodiment, the first configuration information block indicates a first index, and the first index is used to determine the first transmission configuration state set; the first index is a non-negative integer.

In one subembodiment of the above embodiment, the first index is the first-type index.

In one subembodiment of the above embodiment, the first index is a PCI.

In one subembodiment of the above embodiment, the first index is an SCellIndex.

In one subembodiment of the above embodiment, the first index is an ServCellIndex.

In one subembodiment of the above embodiment, the first index is used to identify a cell associated with the first reference signal resource.

In one subembodiment of the above embodiment, one the transmission configuration state corresponds to one the first-type index, and a first-type index corresponding to any transmission configuration state in the first transmission configuration state set is equal to the first index.

In one embodiment, the meaning of the phrase of a reference signal resource being associated with a cell includes: a PCI of the cell is used to generate a reference signal corresponding to the reference signal resource.

In one embodiment, the meaning of the phrase of a reference signal resource being associated with a cell includes: the reference signal resource and a Synchronization Signal (SS)/Physical Broadcast Channel (PBCH) Block of the a cell are Quasi Co-Located.

In one embodiment, the meaning of the phrase of a reference signal resource being associated with a cell includes: the a reference signal resource is transmitted by the cell.

In one embodiment, the meaning of the phrase of a reference signal resource being associated with a cell includes: radio resources occupied by the reference signal resource are indicated by a configuration signaling, an RLC bearer that the configuration signaling goes through is configured by a CellGroupConfig IE, and a Special Cell (SpCell) configured by the CellGroupConfig IE comprises the cell.

In one subembodiment of the above embodiment, the configuration signaling comprises an RRC signaling.

In one subembodiment of the above embodiment, the radio resources comprise time-frequency resources.

In one subembodiment of the above embodiment, the radio resources comprise an RS sequence.

In one subembodiment of the above embodiment, the radio resources comprise code-domain resources.

In one embodiment, one the transmission configuration state corresponds to a second-type index, the second-type index is used to identify a group of reference signal resources, and reference signal resources indicated by one the transmission configuration state belong to a group of reference signal resources identified by a corresponding second-type index.

In one embodiment, one the second-type index is a non-negative integer.

In one embodiment, one the second-type index is used to identify a Transmitter Receiver Point (TRP).

In one embodiment, one the second-type index is used to identify a panel.

In one embodiment, the first configuration information block indicates a second index, and the second index is used to determine the first transmission configuration state set; the second index is the second-type index.

In one subembodiment of the above embodiment, one the transmission configuration state corresponds to one the second-type index, and a second-type index corresponding to any transmission configuration state in the first transmission configuration state set is equal to the second index.

In one embodiment, the first transmission information block indicates a target transmission configuration state, and the target transmission configuration state is used to determine the first transmission state set.

In one subembodiment of the above embodiment, the target transmission configuration state is a TCI state.

In one subembodiment of the above embodiment, a reference signal indicated by any transmission configuration state in the first transmission configuration state set and a reference signal indicated by the target transmission configuration state are QCL.

In one subembodiment of the above embodiment, a reference signal indicated by any transmission configuration state in the first transmission configuration state set and a reference signal indicated by the target transmission configuration state are QCL corresponding to QCL-TypeD.

In one subembodiment of the above embodiment, a reference signal with a corresponding QCL type of TypeD indicated by any transmission configuration state in the first transmission configuration state set and a reference signal with a corresponding QCL type of TypeD indicated by the target transmission configuration state are QCL.

In one subembodiment of the above embodiment, a reference signal with a corresponding QCL type of TypeD indicated by any transmission configuration state in the first transmission configuration state set and a reference signal with a corresponding QCL type of TypeD indicated by the target transmission configuration state are QCL corresponding to QCL-TypeD.

In one embodiment, the first transmission configuration state set corresponds to the first reference signal resource.

In one embodiment, the first configuration information block indicates that the first transmission configuration state set corresponds to the first reference signal resource.

In one embodiment, the configuration information of the first reference signal resource comprises the first transmission configuration state set.

In one embodiment, the first reference signal resource is configured with the first transmission configuration state set.

In one embodiment, the second transmission configuration state belongs to the first transmission configuration state set.

In one embodiment, the second transmission configuration state does not belong to the first transmission configuration state set.

In one embodiment, the first configuration information block is used to determine T transmission configuration states, T being a positive integer greater than 1; the first transmission configuration state set is a subset of the T transmission configuration states.

In one subembodiment of the above embodiment, the second transmission configuration state is one of the T transmission configuration states.

In one subembodiment of the above embodiment, the first transmission configuration state set consists of all transmission configuration states except the second transmission configuration state among the T transmission configuration states.

In one subembodiment of the above embodiment, the first transmission configuration state is used to determine the first transmission configuration state set out of the T transmission configuration states.

In one subembodiment of the above embodiment, the first transmission configuration state set comprises all transmission configuration states among the T transmission configuration states indicating that a reference signal and a reference signal indicated by the first transmission configuration state are QCL.

In one embodiment, the first signaling comprises a physical-layer signaling.

In one embodiment, the first signaling is a physical-layer signaling.

In one embodiment, the first signaling comprises a layer 1 (L1) signaling.

In one embodiment, the first signaling comprises DownLink Control Information (DCI).

In one embodiment, the first signaling is DCI.

In one embodiment, the first signaling comprises one or more fields in a DCI.

In one embodiment, the first signaling comprises a DCI for DownLink Grant.

In one embodiment, the first signaling comprises a DCI for beam indication.

In one embodiment, the first signaling comprises a DCI for downlink beam indication.

In one embodiment, a DCI format of the first signaling is one of DCI format 1_0, DCI format 1_1 or DCI format 1_2.

In one embodiment, a Cyclic Redundancy Check (CRC) of the first signaling is scrambled by a Cell-Radio Network Temporary Identifier (C-RNTI).

In one embodiment, the first transmission configuration state is a TCI state.

In one embodiment, the first transmission configuration state indicates a QCL relation.

In one embodiment, the second transmission configuration state is a TCI state.

In one embodiment, the second transmission configuration state indicates a QCL relation.

In one embodiment, the first signaling indicates a TCI codepoint corresponding to a first transmission configuration state.

In one embodiment, the first signaling comprises a first field, and the first field of the first signaling indicates the first transmission configuration state; the first field comprises at least one bit.

In one embodiment, a number of bit(s) comprised in the first field is equal to 1, 2 or 3.

In one embodiment, the first field comprises all or partial information in a Transmission configuration indication field in a DCI.

In one embodiment, the first field is a Transmission configuration indication field in a DCI.

In one embodiment, the first field indicates a TCI state.

In one embodiment, the field in the first signaling indicates a TCI codepoint corresponding to the first transmission configuration state.

In one embodiment, a value of the first field in the first signaling is equal to a TCI codepoint corresponding to the first transmission configuration state.

In one embodiment, the first transmission state is an active transmission configuration state after the first time.

In one embodiment, the first transmission configuration state is used after the first time to determine a QCL relation of a DMRS of a UE-dedicated PDSCH for the first node and a QCL relation of all or partial COntrol REsource SETs (CORESETs).

In one embodiment, the first transmission configuration state is used after the first time to determine a QCL relation of DMRS of a UE-dedicated PDSCH for the first node on a first frequency band and a QCL relation of all or partial CORESETs on the first frequency band.

In one embodiment, the first transmission configuration state is used after the first time to determine a QCL relation of all CORESETs belonging to a first CORESET pool on a first frequency band and a QCL relation of DMRS of a UE-dedicated PDSCH scheduled by a PDCCH in to a CORESET belonging to the first CORESET pool; the first CORESET pool comprises at least one CORESET.

In one embodiment, the first transmission configuration state is used after the first time to determine a spatial domain transmission filter of a PUSCH based on dynamic-grant or configured-grant for the first node and a spatial domain transmission filter of all or partial dedicated PUCCH resources.

In one embodiment, the first transmission configuration state is used after the first time to determine a spatial domain transmission filter based on a dynamic-grant or configuration-grant PUSCH on a first frequency band and a spatial domain transmission filter of all or partial dedicated PUCCH resources.

In one embodiment, the first transmission configuration state is used after the first time to determine a spatial domain transmission filter based on a dynamic-grant or configuration-grant PUSCH associated with a beam pair on a first frequency band and a spatial domain transmission filter of dedicated PUCCH resources associated with the beam pair.

In one embodiment, the first frequency band is a carrier.

In one embodiment, the first frequency band is a BWP.

In one embodiment, the first frequency band is a serving cell.

In one embodiment, the first signaling indicates the first frequency band.

In one embodiment, a value of a bit field comprised in the first signaling indicates the first frequency band.

In one embodiment, the first frequency band is a carrier to which the first signaling belongs.

In one embodiment, the first frequency band is a BWP to which the first signaling belongs.

In one embodiment, the first frequency band is a service cell to which the first signaling belongs.

In one embodiment, the first signaling is used to determine the first CORESET pool.

In one embodiment, the first CORESET pool is a CORESET pool to which the first signaling belongs.

In one embodiment, the first signaling is used to determine the one beam pair.

In one embodiment, the first signaling indicates the one beam pair.

In one embodiment, the second transmission configuration state is configured by the first configuration information block.

In one embodiment, the second transmission configuration state is configured by an RRC signaling.

In one embodiment, the second transmission configuration state is configured by a MAC CE signaling.

In one embodiment, the second transmission configuration state is indicated by a dynamic signaling.

In one embodiment, the first transmission configuration state indicates a second reference signal resource and indicates that a QCL type corresponding to the second reference signal resource is TypeD; the second transmission configuration state indicates a third reference signal resource and indicates that a QCL type corresponding to the third reference signal resource is TypeD; the second reference signal resource and the third reference signal resource are not quasi co-located.

In one embodiment, the QCL types comprise TypeA, TypeB, TypeC and TypeD.

In one embodiment, the first transmission configuration state indicates an ID of the second reference signal resource.

In one embodiment, the second transmission configuration state indicates an ID of the third reference signal resource.

In one embodiment, the second reference signal resource comprises a CSI-RS resource.

In one embodiment, the second reference signal resource comprises an SS/PBCH Block resource.

In one embodiment, the second reference signal resource comprises an SRS resource.

In one embodiment, the third reference signal resource comprises a CSI-RS resource.

In one embodiment, the third reference signal resource comprises an SS/PBCH Block resource.

In one embodiment, the third reference signal resource comprises an SRS resource.

Embodiment 2

Figure 2:
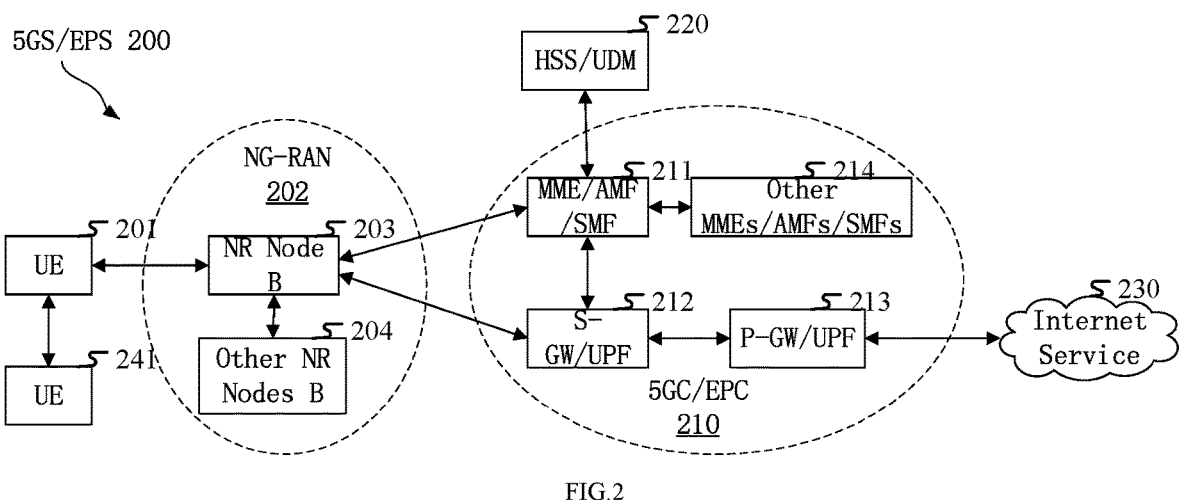
FIG. 2 illustrates a schematic diagram of a network architecture according to one embodiment of the present disclosure.

Embodiment 2 illustrates a schematic diagram of a network architecture according to one embodiment of the present disclosure, as shown in FIG. 2.

FIG. 2 is a diagram illustrating a network architecture 200 of Long-Term Evolution (LIE), Long-Term Evolution Advanced (LIE-A) and future 5G systems. The LIE, LIE-A and future 5G systems network architecture 200 may be called an Evolved Packet System (EPS) 200. The 5G NR or LTE network architecture 200 may be called a 5G System (5GS)/Evolved Packet System (EPS) 200 or other appropriate terms. The 5GS/EPS 200 may comprise one or more UEs 201, a UE 241 that is in Sidelink communications with a UE 201, an NG-RAN 202, a 5G-Core Network/Evolved Packet Core (5GC/EPC) 210, a Home Subscriber Server (HSS)/Unified Data Management (UDM) 220 and an Internet Service 230. The 5GS/EPS 200 may be interconnected with other access networks. For simple description, the entities/interfaces are not shown. As shown in FIG. 2, the 5GS/EPS 200 provides packet switching services. Those skilled in the art will find it easy to understand that various concepts presented throughout the present disclosure can be extended to networks providing circuit switching services. The NG-RAN 202 comprises an NR node B (gNB) 203 and other gNBs 204. The gNB 203 provides UE 201-oriented user plane and control plane protocol terminations. The gNB 203 may be connected to other gNBs 204 via an Xn interface (for example, backhaul). The gNB 203 may be called a base station, a base transceiver station, a radio base station, a radio transceiver, a transceiver function, a Base Service Set (BSS), an Extended Service Set (ESS), a Transmitter Receiver Point (TRP) or some other applicable terms. The gNB 203 provides an access point of the 5GC/EPC 210 for the UE 201. Examples of the UE 201 include cellular phones, smart phones, Session Initiation Protocol (SIP) phones, laptop computers, Personal Digital Assistant (PDA), Satellite Radios, Global Positioning Systems (GPSs), multimedia devices, video devices, digital audio players (for example, MP3 players), cameras, game consoles, unmanned aerial vehicles (UAV), aircrafts, narrow-band physical network devices, machine-type communication devices, land vehicles, automobiles, wearable devices, or any other devices having similar functions. Those skilled in the art also can call the UE 201 a mobile station, a subscriber station, a mobile unit, a subscriber unit, a wireless unit, a remote unit, a mobile device, a wireless device, a radio communication device, a remote device, a mobile subscriber station, an access terminal, a mobile terminal, a wireless terminal, a remote terminal, a handset, a user proxy, a mobile client, a client or some other appropriate terms. The gNB 203 is connected to the 5GC/EPC 210 via an S1/NG interface. The 5GC/EPC 210 comprises a Mobility Management Entity (MME)/Authentication Management Field (AMF)/Session Management Function (SMF) 211, other MMES/AMFs/SMFs 214, a Service Gateway (S-GW)/User Plane Function (UPF) 212 and a Packet Date Network Gateway (P-GW)/UPF 213. The MME/AMF/SMF 211 is a control node for processing a signaling between the UE 201 and the 5GC/EPC 210. Generally, the MME/AMF/SMF 211 provides bearer and connection management. All user Internet Protocol (IP) packets are transmitted through the S-GW/UPF 212, the S-GW/UPF 212 is connected to the P-GW/UPF 213. The P-GW provides UE IP address allocation and other functions. The P-GW/UPF 213 is connected to the Internet Service 230. The Internet Service 230 comprises IP services corresponding to operators, specifically including Internet, Intranet, IP Multimedia Subsystem (IMS) and Packet Switching Services.

In one embodiment, the first node in the present disclosure comprises the UE 201.

In one embodiment, the second node in the present disclosure comprises the gNB 203.

In one embodiment, a radio link between the UE 201 and the gNB 203 is a cellular network link.

In one embodiment, a transmitter of the first configuration information block in the present disclosure comprises the gNB 203.

In one embodiment, a receiver of the first configuration information block in the present disclosure comprises the UE 201.

In one embodiment, a transmitter of the first signaling in the present disclosure comprises the gNB 203.

In one embodiment, a receiver of the first signaling in the present disclosure comprises the UE 201.

In one embodiment, a transmitter of the first reference signal resource in the present disclosure comprises the gNB 203.

In one embodiment, a receiver of the first reference signal resource in the present disclosure comprises the UE 201.

Embodiment 3

Figure 3:
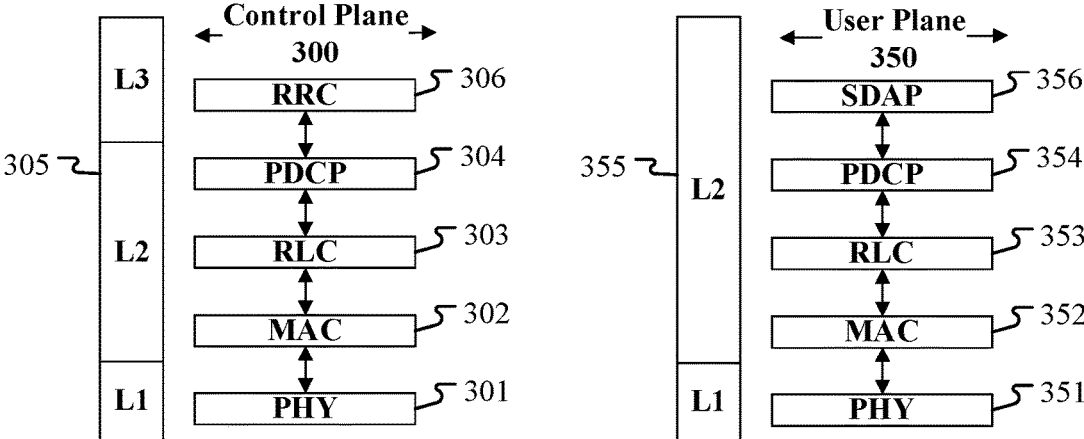
FIG. 3 illustrates a schematic diagram of a radio protocol architecture of a user plane and a control plane according to one embodiment of the present disclosure.

Embodiment 3 illustrates a schematic diagram of a radio protocol architecture of a user plane and a control plane according to one embodiment of the present disclosure, as shown in FIG. 3.

Embodiment 3 illustrates a schematic diagram of an example of a radio protocol architecture of a user plane and a control plane according to one embodiment of the present disclosure, as shown in FIG. 3. FIG. 3 is a schematic diagram illustrating an embodiment of a radio protocol architecture of a user plane 350 and a control plane 300. In FIG. 3, the radio protocol architecture for a first communication node (UE, gNB or an RSU in V2X) and a second communication node (gNB, UE or an RSU in V2X), or between two UEs is represented by three layers, which are a layer 1, a layer 2 and a layer 3, respectively. The layer 1 (L1) is the lowest layer and performs signal processing functions of various PHY layers. The L1 is called PHY 301 in the present disclosure. The layer 2 (L2) 305 is above the PHY 301, and is in charge of a link between a first communication node and a second communication node, or between two UEs. L2 305 comprises a Medium Access Control (MAC) sublayer 302, a Radio Link Control (RLC) sublayer 303 and a Packet Data Convergence Protocol (PDCP) sublayer 304. All the three sublayers terminate at the second communication node. The PDCP sublayer 304 provides multiplexing among variable radio bearers and logical channels. The PDCP sublayer 304 provides security by encrypting a packet and provides support for a first communication node handover between second communication nodes. The RLC sublayer 303 provides segmentation and reassembling of a higher-layer packet, retransmission of a lost packet, and reordering of a data packet so as to compensate the disordered receiving caused by HARQ. The MAC sublayer 302 provides multiplexing between a logical channel and a transport channel. The MAC sublayer 302 is also responsible for allocating between first communication nodes various radio resources (i.e., resource block) in a cell. The MAC sublayer 302 is also in charge of HARQ operation. The Radio Resource Control (RRC) sublayer 306 in layer 3 (L3) of the control plane 300 is responsible for acquiring radio resources (i.e., radio bearer) and configuring the lower layer with an RRC signaling between a second communication node and a first communication node device. The radio protocol architecture of the user plane 350 comprises layer 1 (L1) and layer 2 (L2). In the user plane 350, the radio protocol architecture for the first communication node and the second communication node is almost the same as the corresponding layer and sublayer in the control plane 300 for physical layer 351, PDCP sublayer 354, RLC sublayer 353 and MAC sublayer 352 in L2 layer 355, but the PDCP sublayer 354 also provides a header compression for a higher-layer packet so as to reduce a radio transmission overhead. The L2 layer 355 in the user plane 350 also includes Service Data Adaptation Protocol (SDAP) sublayer 356, which is responsible for the mapping between QoS flow and Data Radio Bearer (DRB) to support the diversity of traffic. Although not described in FIG. 3, the first communication node may comprise several higher layers above the L2 layer 355, such as a network layer (e.g., IP layer) terminated at a P-GW of the network side and an application layer terminated at the other side of the connection (e.g., a peer UE, a server, etc.).

In one embodiment, the radio protocol architecture in FIG. 3 is applicable to the first node in the present disclosure.

In one embodiment, the radio protocol architecture in FIG. 3 is applicable to the second node in the present disclosure.

In one embodiment, the first configuration information block is generated by the RRC sublayer 306.

In one embodiment, the first configuration information block is generated by the MAC sublayer 302 or the MAC sublayer 352.

In one embodiment, a part of the first configuration information block is generated by the RRC sublayer 306; and the other part of the first configuration information block is used to generate the MAC sublayer 302 or the MAC sublayer 352.

In one embodiment, the first signaling is generated by the PHY 301 or the PHY 351.

In one embodiment, the first signaling is generated by the MAC sublayer 302 or the MAC sublayer 352.

In one embodiment, the first reference signal resource is generated by the PHY 301 or the PHY 351.

In one embodiment, the first information block is generated by the PHY 301 or the PHY 351.

In one embodiment, the second information block is generated by the PHY 301 or the PHY 351.

In one embodiment, the first signal is generated by the PHY 301 or the PHY 351.

In one embodiment, the second signal is generated by the PHY 301 or the PHY 351.

In one embodiment, the second information block is generated by the RRC sublayer 306.

In one embodiment, the second configuration information block is generated by the MAC sublayer 302 or the MAC sublayer 352.

In one embodiment, a part of the second configuration information block is generated by the RRC sublayer 306; and the other part of the second configuration information block is used to generate the MAC sublayer 302 or the MAC sublayer 352.

Embodiment 4

Figure 4:
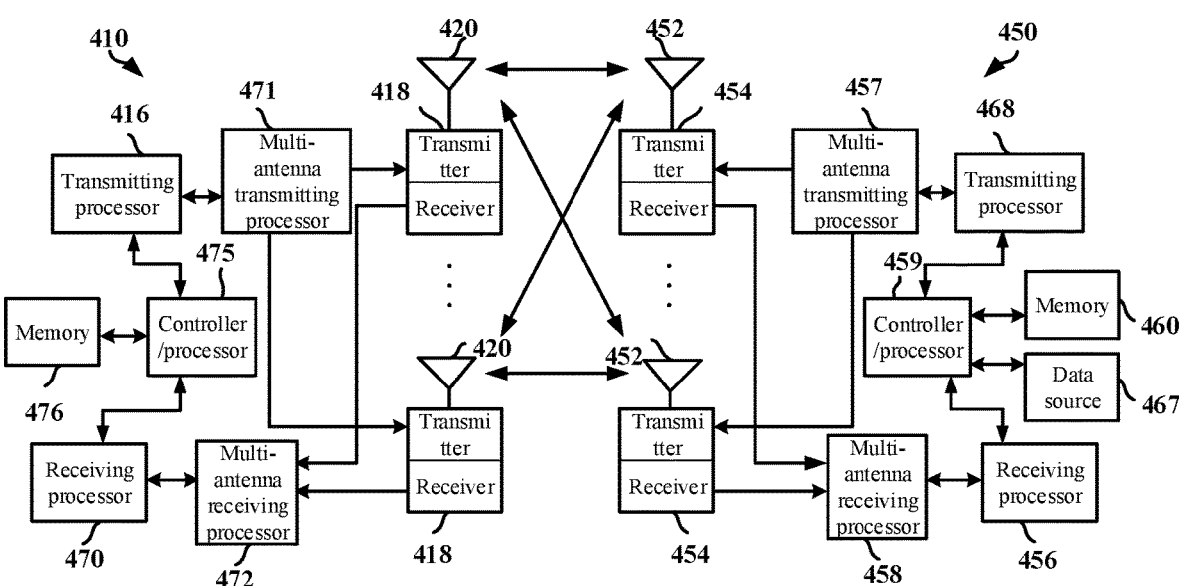
FIG. 4 illustrates a schematic diagram of a first communication device and a second communication device according to one embodiment of the present disclosure.

Embodiment 4 illustrates a schematic diagram of a first communication device and a second communication device according to one embodiment of the present disclosure, as shown in FIG. 4. FIG. 4 is a block diagram of a first communication device 410 in communication with a second communication device 450 in an access network.

The first communication device 410 comprises a controller/processor 475, a memory 476, a receiving processor 470, a transmitting processor 416, a multi-antenna receiving processor 472, a multi-antenna transmitting processor 471, a transmitter/receiver 418 and an antenna 420.

The second communication device 450 comprises a controller/processor 459, a memory 460, a data source 467, a transmitting processor 468, a receiving processor 456, a multi-antenna transmitting processor 457, a multi-antenna receiving processor 458, a transmitter/receiver 454 and an antenna 452.

In a transmission from the first communication device 410 to the second communication device 450, at the first communication device 410, a higher layer packet from the core network is provided to a controller/processor 475. The controller/processor 475 provides a function of the L2 layer. In DL transmission, the controller/processor 475 provides header compression, encryption, packet segmentation and reordering, and multiplexing between a logical channel and a transport channel, and radio resource allocation for the second communication device 450 based on various priorities. The controller/processor 475 is also in charge of HARQ operation, retransmission of a lost packet, and a signaling to the second communication node 450. The transmitting processor 416 and the multi-antenna transmitting processor 471 perform various signal processing functions used for the L1 layer (that is, PHY). The transmitting processor 416 performs coding and interleaving so as to ensure an FEC (Forward Error Correction) at the second communication device 450, and the mapping to signal clusters corresponding to each modulation scheme (i.e., BPSK, QPSK, M-PSK, M-QAM, etc.). The multi-antenna transmitting processor 471 performs digital spatial precoding, including codebook-based precoding and non-codebook-based precoding, and beamforming on encoded and modulated symbols to generate one or more parallel streams. The transmitting processor 416 then maps each parallel stream into a subcarrier. The mapped symbols are multiplexed with a reference signal (i.e., pilot frequency) in time domain and/or frequency domain, and then they are assembled through Inverse Fast Fourier Transform (IFFT) to generate a physical channel carrying time-domain multi-carrier symbol streams. After that the multi-antenna transmitting processor 471 performs transmission analog precoding/beamforming on the time-domain multi-carrier symbol streams. Each transmitter 418 converts a baseband multicarrier symbol stream provided by the multi-antenna transmitting processor 471 into a radio frequency (RF) stream. Each radio frequency stream is later provided to different antennas 420.

In a transmission from the first communication device 410 to the second communication device 450, at the second communication device 450, each receiver 454 receives a signal via a corresponding antenna 452. Each receiver 454 recovers information modulated to the RF carrier, converts the radio frequency stream into a baseband multicarrier symbol stream to be provided to the receiving processor 456. The receiving processor 456 and the multi-antenna receiving processor 458 perform signal processing functions of the L1 layer. The multi-antenna receiving processor 458 performs receiving analog precoding/beamforming on a baseband multicarrier symbol stream from the receiver 454. The receiving processor 456 converts the baseband multicarrier symbol stream after receiving the analog precoding/beamforming from time domain into frequency domain using FFT. In frequency domain, a physical layer data signal and a reference signal are de-multiplexed by the receiving processor 456, wherein the reference signal is used for channel estimation, while the data signal is subjected to multi-antenna detection in the multi-antenna receiving processor 458 to recover any second communication device 450-targeted parallel stream. Symbols on each parallel stream are demodulated and recovered in the receiving processor 456 to generate a soft decision. Then the receiving processor 456 decodes and de-interleaves the soft decision to recover the higher-layer data and control signal transmitted on the physical channel by the first communication node 410. Next, the higher-layer data and control signal are provided to the controller/processor 459. The controller/processor 459 performs functions of the L2 layer. The controller/processor 459 can be connected to a memory 460 that stores program code and data. The memory 460 can be called a computer readable medium. In downlink (DL) transmission, the controller/processor 459 provides demultiplexing between a transport channel and a logical channel, packet reassembling, decryption, header decompression and control signal processing so as to recover a higher-layer packet from the core network. The higher-layer packet is later provided to all protocol layers above the L2 layer, or various control signals can be provided to the L3 layer for processing. The controller/processor 459 also performs error detection using ACK and/or NACK protocols as a way to support HARQ operation.

In a transmission from the second communication device 450 to the first communication device 410, at the second communication device 450, the data source 467 is configured to provide a higher-layer packet to the controller/processor 459. The data source 467 represents all protocol layers above the L2 layer. Similar to a transmitting function of the first communication device 410 described in DL transmission, the controller/processor 459 performs header compression, encryption, packet segmentation and reordering, and multiplexing between a logical channel and a transport channel based on radio resource allocation of the first communication device 410 so as to provide the L2 layer functions used for the user plane and the control plane. The controller/processor 459 is also responsible for HARQ operation, retransmission of a lost packet, and a signaling to the first communication device 410. The transmitting processor 468 performs modulation mapping and channel coding. The multi-antenna transmitting processor 457 implements digital multi-antenna spatial precoding, including codebook-based precoding and non-codebook-based precoding, as well as beamforming. Following that, the generated parallel streams are modulated into multicarrier/single-carrier symbol streams by the transmitting processor 468, and then modulated symbol streams are subjected to analog precoding/beamforming in the multi-antenna transmitting processor 457 and provided from the transmitters 454 to each antenna 452. Each transmitter 454 first converts a baseband symbol stream provided by the multi-antenna transmitting processor 457 into a radio frequency symbol stream, and then provides the radio frequency symbol stream to the antenna 452.

In the transmission from the second communication device 450 to the first communication device 410, the function of the first communication device 410 is similar to the receiving function of the second communication device 450 described in the transmission from the first communication device 410 to the second communication device 450. Each receiver 418 receives a radio frequency signal via a corresponding antenna 420, converts the received radio frequency signal into a baseband signal, and provides the baseband signal to the multi-antenna receiving processor 472 and the receiving processor 470. The receiving processor 470 and multi-antenna receiving processor 472 collectively provide functions of the L1 layer. The controller/processor 475 provides functions of the L2 layer. The controller/processor 475 can be connected with the memory 476 that stores program code and data. The memory 476 can be called a computer readable medium. the controller/processor 475 provides de-multiplexing between a transport channel and a logical channel, packet reassembling, decryption, header decompression, control signal processing so as to recover a higher-layer packet from the second communication device 450. The higher-layer packet coming from the controller/processor 475 may be provided to the core network. The controller/processor 475 can also perform error detection using ACK and/or NACK protocols to support HARQ operation.

In one embodiment, the second communication device 450 comprises at least one processor and at least one memory. The at least one memory comprises computer program codes; the at least one memory and the computer program codes are configured to be used in collaboration with the at least one processor. The second communication device 450 at least: receives the first configuration information block; receives the first signaling; and receives the first reference signal resource.

In one embodiment, the second communication device 450 comprises a memory that stores a computer readable instruction program. The computer readable instruction program generates an action when executed by at least one processor. The action includes: receiving the first configuration information block; receiving the first signaling; and receiving the first reference signal resource.

In one embodiment, the first communication device 410 comprises at least one processor and at least one memory. The at least one memory comprises computer program codes; the at least one memory and the computer program codes are configured to be used in collaboration with the at least one processor. The first communication device 410 at least: transmits the first configuration information block; transmits the first signaling; and transmits the first reference signal resource.

In one embodiment, the first communication device 410 comprises a memory that stores a computer readable instruction program. The computer readable instruction program generates an action when executed by at least one processor. The action includes: transmitting the first configuration information block; transmitting the first signaling; and transmitting the first reference signal resource.

In one embodiment, the first node in the present disclosure comprises the second communication device 450.

In one embodiment, the second node in the present disclosure comprises the first communication device 410.

In one embodiment, at least one of the antenna 452, the receiver 454, the receiving processor 456, the multi-antenna receiving processor 458, the controller/processor 459, the memory 460, or the data source 467 is used to receive the first configuration information block; and at least one of the antenna 420, the transmitter 418, the transmitting processor 416, the multi-antenna transmitting processor 471, the controller/processor 475, or the memory 476 is used to transmit the first configuration information block.

In one embodiment, at least one of the antenna 452, the receiver 454, the receiving processor 456, the multi-antenna receiving processor 458, the controller/processor 459, the memory 460, or the data source 467 is used to receive the first signaling; and at least one of the antenna 420, the transmitter 418, the transmitting processor 416, the multi-antenna transmitting processor 471, the controller/processor 475, or the memory 476 is used to transmit the first signaling.

In one embodiment, at least one of the antenna 452, the receiver 454, the receiving processor 456, the multi-antenna receiving processor 458, the controller/processor 459, the memory 460, or the data source 467 is used to receive the first reference signal resource; at least one of the antenna 420, the transmitter 418, the transmitting processor 416, the multi-antenna transmitting processor 471, the controller/processor 475, or the memory 476 is used to transmit the first reference signal resource.

In one embodiment, at least one of the antenna 420, the receiver 418, the receiving processor 470, the multi-antenna receiving processor 472, the controller/processor 475 or the memory 476 is used to receive the first information block; and at least one of the antenna 452, the transmitter 454, the transmitting processor 468, the multi-antenna transmitting processor 457, the controller/processor 459 or the memory 460 is used to transmit the first information block.

In one embodiment, at least one of the antenna 420, the receiver 418, the receiving processor 470, the multi-antenna receiving processor 472, the controller/processor 475 or the memory 476 is used to receive the second information block; and at least one of the antenna 452, the transmitter 454, the transmitting processor 468, the multi-antenna transmitting processor 457, the controller/processor 459 or the memory 460 is used to transmit the second information block.

In one embodiment, at least one of the antenna 420, the receiver 418, the receiving processor 470, the multi-antenna receiving processor 472, the controller/processor 475 or the memory 476 is used to receive the first signal; and at least one of the antenna 452, the transmitter 454, the transmitting processor 468, the multi-antenna transmitting processor 457, the controller/processor 459 or the memory 460 is used to transmit the first signal.

In one embodiment, at least one of the antenna 452, the receiver 454, the receiving processor 456, the multi-antenna receiving processor 458, the controller/processor 459, the memory 460, or the data source 467 is used to receive the second signal; and at least one of the antenna 420, the transmitter 418, the transmitting processor 416, the multi-antenna transmitting processor 471, the controller/processor 475, or the memory 476 is used to transmit the second signal.

In one embodiment, at least one of the antenna 452, the receiver 454, the receiving processor 456, the multi-antenna receiving processor 458, the controller/processor 459, the memory 460, or the data source 467 is used to receive the second configuration information block in the present disclosure; and at least one of the antenna 420, the transmitter 418, the transmitting processor 416, the multi-antenna transmitting processor 471, the controller/processor 475, or the memory 476 is used to transmit the second configuration information block.

Embodiment 5

Figure 5:
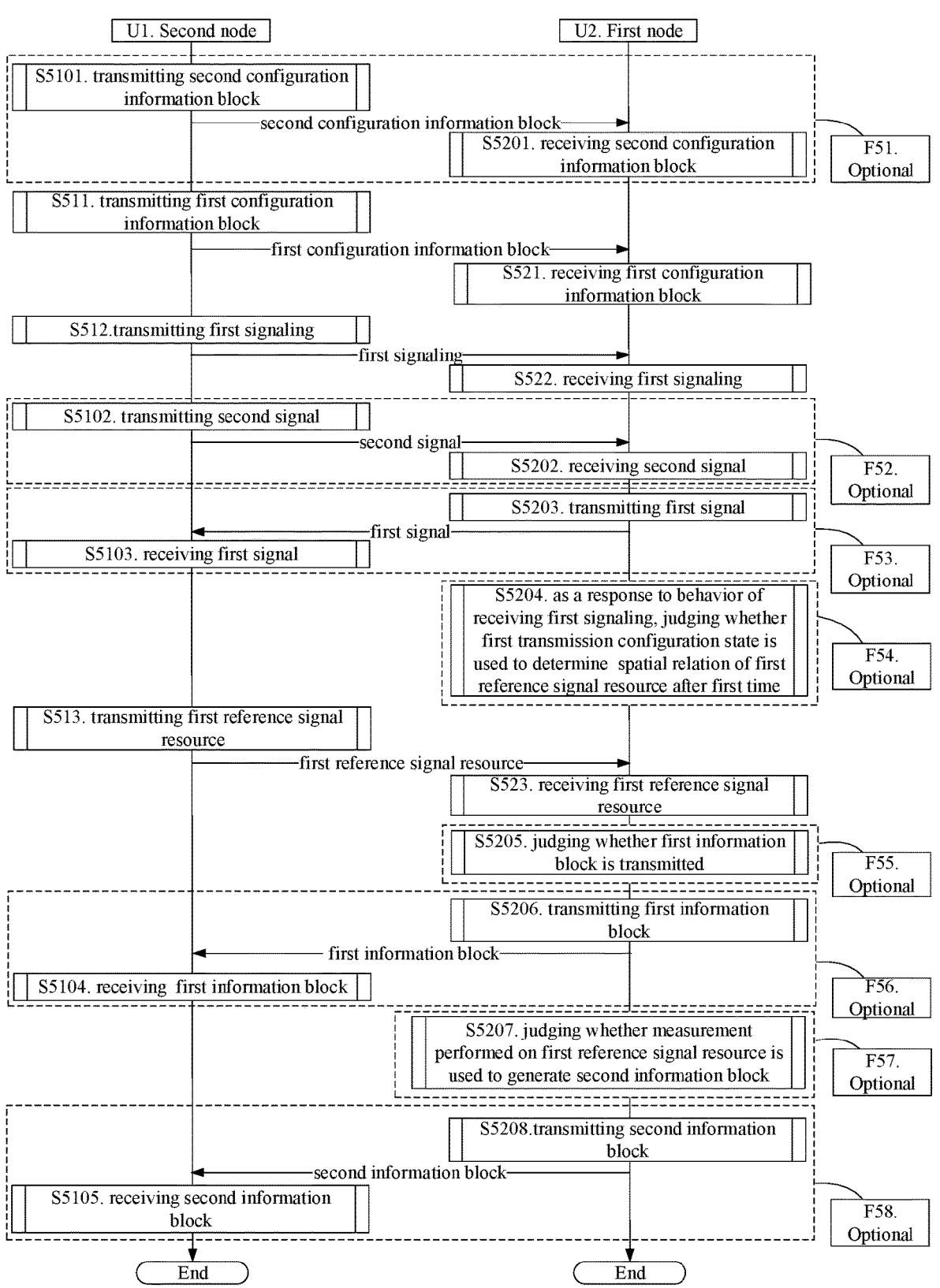
FIG. 5 illustrates a flowchart of wireless communications according to one embodiment of the present disclosure.

Embodiment 5 illustrates a flowchart of wireless transmission according to one embodiment in the present disclosure, as shown in FIG. 5. In FIG. 5, a second node U1 and a first node U2 are communication nodes transmitted via an air interface. In FIG. 5, steps in F51 to F58 are respectively optional.

The second node U1 transmits a second configuration information block in step S5101; transmits a first configuration information block in step S511; transmits a first signaling in step S512; transmits a second signal in step S5102; receives a first signal in step S5103; transmits a first reference signal resource in step S513; receives a first information block in step S5104; and receives a second information block in step S5105.

The first node U2 receives a second configuration information block in step S5201; receives a first configuration information block in step S521; receives a first signaling in step S522; receives a second signal in step S5202; transmits a first signal in step S5203; as a response to the behavior of receiving the first signaling in step S5204, judges whether a first transmission configuration state is used to determine a spatial relation of a first reference signal resource after a first time; and receives the first reference signal resource in step S523; judges whether a first information block in step S5205; transmits the first information block in step S5206; judges whether a measurement performed on the first reference signal resource is used to generate a second information block in step S5207; and transmits the second information block in step S5208.

In embodiment 5, the first configuration information block comprises configuration information of the first reference signal resource; the first signaling indicates the first transmission configuration state; the first configuration information block is used by the first node U2 to determine a first transmission configuration state set, and the first transmission configuration state set comprises at least one transmission configuration state; the first signaling is used by the first node U2 to determine a first time; a second transmission configuration state is used by the first node U2 to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission state is used by the first node U2 to determine the spatial relation of the first reference signal resource after the first time; and when the first transmission configuration state does not belong to the first transmission configuration state set, the second transmission configuration state is used by the first node U2 to determine the spatial relation of the first reference signal resource after the first time.

In one embodiment, the first node U2 is the first node in the present disclosure.

In one embodiment, the second node U1 is the second node in the present disclosure.

In one embodiment, an air interface between the second node U1 and the first node U2 comprises a radio interface between a base station and a UE.

In one embodiment, an air interface between the second node U1 and the first node U2 comprises a radio interface between UEs.

In one embodiment, the second node U1 is a serving cell maintenance base station of the first node U2.

In one embodiment, the first signaling is used by the second node U1 to determine the first time.

In one embodiment, the meaning of the phrase of transmitting the first reference signal resource includes: transmitting a reference signal in the first reference signal resource.

In one embodiment, the meaning of the phrase of transmitting the first reference signal resource includes: transmitting a reference signal corresponding to the first reference signal resource.

In one embodiment, the meaning of the phrase of transmitting the first reference signal resource includes: transmitting a reference signal transmitted according to configuration information of the first reference signal resource.

In one embodiment, the first configuration information block is transmitted in a downlink physical layer data channel (i.e., a downlink channel capable of carrying physical layer data).

In one embodiment, the first configuration information block is transmitted in a PDSCH.

In one embodiment, the first signaling is transmitted in a downlink physical layer control channel (i.e., a downlink channel only capable of carrying a physical layer signaling).

In one embodiment, the first signaling is transmitted in a PDCCH.

In one embodiment, steps in box F51 in FIG. 5 exist; the second configuration information block is used by the first node U2 to determine N transmission configuration states, N being a positive integer greater than 1; and the first signaling indicates the first transmission configuration state out of the N transmission configuration states.

In one embodiment, the second configuration information block is transmitted in a PDSCH.

In one embodiment, steps in the box marked by F52 in FIG. 5 exist; the first signaling comprises scheduling information of the second signal.

In one embodiment, the second signal is transmitted in a PDSCH.

In one embodiment, steps in the box marked by F52 in FIG. 5 do not exist.

In one embodiment, steps in box F53 in FIG. 5 exist; the first signal carries a HARQ-ACK associated with the first signaling.

In one embodiment, the first signal is transmitted in a PUCCH.

In one embodiment, the first signal is transmitted in a PUSCH.

In one embodiment, steps in boxes F52 and F53 in FIG. 5 exist.

In one embodiment, steps in box F52 in FIG. 5 do not exist, and steps in box F53 exist.

In one embodiment, steps in box F54 in FIG. 5 exist; the method in a first node for wireless communications comprises:

in response to the behavior of receiving the first signaling, judging whether the first transmission configuration state is used to determine a spatial relation of the first reference signal resources after the first time.

In one embodiment, the first node judges whether the first transmission configuration state is used to determine a spatial relation of the first reference signal resource after the first time according to whether the first transmission configuration state belongs to the first transmission configuration state set.

In one embodiment, steps in the box marked by F55 in FIG. 5 exist; the method in a first node for wireless communications comprises:

judging whether the first information block is transmitted.

In one embodiment, the first node judges whether the first information block is transmitted according to whether the first transmission configuration state belongs to the first transmission configuration state set.

In one embodiment, the behavior of judging whether the first information block is transmitted occurs after the first time.

In one embodiment, steps in the box marked by F56 in FIG. 5 exist; the first node transmits the first information block.

In one embodiment, steps in the box F56 in FIG. 5 do not exist; the first node drops transmitting the first information block.

In one embodiment, steps in the box marked by F56 in FIG. 5 exist; the second node receives the first information block.

In one embodiment, steps in the box F56 in FIG. 5 do not exist; the second node drops receiving the first information block.

In one embodiment, whether the second node receives the first information block is related to whether the first transmission configuration state belongs to the first transmission configuration state set; if the first transmission configuration state belongs to the first transmission configuration state set, the second node receives the first information block; and if the first transmission configuration state does not belong to the first transmission configuration state set, the second node drops receiving the first information block.

In one embodiment, the first information block is transmitted in a PUCCH.

In one embodiment, the first information block is transmitted in a PUSCH.

In one embodiment, steps in box F57 in FIG. 5 exist; the method in a first node for wireless communications comprises:

judging whether a measurement performed on the first reference signal resource is used to generate the second information block.

In one embodiment, the first node judges whether a measurement performed on the first reference signal resource is used by the first node to generate the second information block according to whether the first transmission configuration state belongs to the first transmission configuration state set.

In one embodiment, if the first transmission configuration state does not belong to the first transmission configuration state set, a measurement performed on the first reference signal resource is not used by the first node to generate the second information block.

In one embodiment, the behavior of judging whether a measurement performed on the first reference signal resource is used to generate the second information block occurs after the first time.

In one embodiment, steps in box F58 in FIG. 5 exist; the first node transmits the second information block.

In one embodiment, the second information block is transmitted in a PUCCH.

In one embodiment, the second information block is transmitted in a PUSCH.

Embodiment 6

Embodiment 6 illustrates a schematic diagram of a first signaling being used to determine a first time according to one embodiment of the present disclosure, as shown in FIG. 6.

In one embodiment, the first time is an application time of the first transmission configuration state.

In one embodiment, the first transmission configuration state is in application from the first time.

In one embodiment, a QCL relation indicated by the first transmission configuration state is in application from the first time.

In one embodiment, time-domain resources occupied by the first signaling are used to determine the first time.

In one embodiment, the first time is later than the first signaling.

In one embodiment, the first time is later than a first reference time, and time-domain resources occupied by the first signaling are used to determine the first reference time.

In one subembodiment of the above embodiment, the first reference time is an end time or a start time of time-domain resources occupied by the first signaling.

In one subembodiment of the above embodiment, the first reference time is an end time or a start time of a time unit occupied by the first signaling.

In one embodiment, a time interval between the first time and the first reference time is not less than a first interval.

In one embodiment, a time interval between the first time and the first reference time is equal to a first interval.

In one embodiment, the first time is a start time of a first time unit after a first interval after the first reference time.

In one embodiment, the first interval is RRC configured.

In one embodiment, the first interval is fixed.

In one embodiment, the first interval is a non-negative real number.

In one embodiment, the first interval is a positive integer.

In one embodiment, the first interval is measured by slot.

In one embodiment, a unit of the first interval measured by millisecond (ms).

In one embodiment, the first interval is measured by multicarrier symbol.

In one embodiment, the time unit is a slot.

In one embodiment, the time unit is a sub-slot.

In one embodiment, the time unit is a multicarrier symbol.

In one embodiment, the time unit comprises more than one consecutive multicarrier symbols.

In one embodiment, a number of multicarrier symbols comprised in the time unit is configured by a higher-layer parameter.

In one embodiment, the multicarrier symbol is an Orthogonal Frequency Division Multiplexing (OFDM) symbol.

In one embodiment, the multicarrier symbol is a Single Carrier-Frequency Division Multiple Access (SC-FDMA) symbol.

In one embodiment, the multicarrier symbol is a Discrete Fourier Transform Spread OFDM (DFT-S-OFDM) symbol.

In one embodiment, time-domain resources occupied by the first signal are used to determine the first time.

In one embodiment, the meaning of the phrase of the first signaling being used to determine a first time includes: time-domain resources occupied by the first signal are used to determine the first time, and the first signaling is used to determine time-domain resources occupied by the first signal.

In one embodiment, the first time is later than a second reference time, time-domain resources occupied by the first signal are used to determine the second time, and the first signaling is used to determine time-domain resources occupied by the first signal.

In one subembodiment of the above embodiment, the second reference time is an end time or start time of time-domain resources occupied by the first signal.

In one subembodiment of the above embodiment, the second reference time is an end time or start time of a time unit occupied by the first signal.

In one embodiment, a time interval between the first time and the second reference time is not less than a second interval.

In one embodiment, a time interval between the first time and the second reference time is equal to a second interval.

In one embodiment, the first time is a start time of a first time unit after a second interval after the second reference time.

In one embodiment, the second interval is RRC configured.

In one embodiment, the second interval is fixed.

In one embodiment, the second interval is a non-negative real number.

In one embodiment, the second interval is a positive integer.

In one embodiment, the second interval is measured by slot.

In one embodiment, the second interval is measured by millisecond (ms).

In one embodiment, the second interval is measured by multicarrier symbol.

In one embodiment, the first time is a start time of a first time unit, a time interval between the first time unit and the first reference time is not less than the first interval, and a time interval between the first time unit and the second reference time is not less than a first time unit of the second interval.

Embodiment 7

Embodiment 7 illustrates a schematic diagram of a given transmission configuration state being used to determine a spatial relation of a first reference signal resource according to one embodiment of the present disclosure, as shown in FIG. 7. In embodiment 7, the given transmission configuration state is the first transmission configuration state or the second transmission configuration state.

In one embodiment, the given transmission configuration state is the first transmission configuration state.

In one embodiment, the given transmission configuration state is the second transmission configuration state.

In one embodiment, the spatial relation comprises a TCI state.

In one embodiment, the spatial relation comprises a QCL parameter.

In one embodiment, the spatial relation comprises a QCL relation.

In one embodiment, the spatial relation comprises a QCL assumption.

In one embodiment, the spatial relation comprises a spatial-domain domain filter.

In one embodiment, the spatial domain relation comprises a spatial-domain transmission filter.

In one embodiment, the spatial domain relation comprises a spatial-domain receive filter.

In one embodiment, the spatial relation comprises a Spatial Tx parameter.

In one embodiment, the spatial relation comprises a Spatial Rx parameter.

In one embodiment, the spatial relation comprises large-scale properties.

In one embodiment, the large-scale properties comprise one or more of delay spread, Doppler spread, Doppler shift, average delay, or Spatial Rx parameters.

In one embodiment, the meaning of the phrase of a given transmission configuration state being used to determine a spatial relation of the first reference signal resource includes: the given transmission configuration state indicates a QCL relation between a reference signal port of the first reference signal resource and one or more reference signals.

In one embodiment, the meaning of the phrase of a given transmission configuration state being used to determine a spatial relation of the first reference signal resource includes: the given transmission configuration state is a TCI state, and a TCI state of the first reference signal resource is the given transmission configuration state.

In one embodiment, the meaning of the phrase of a given transmission configuration state being used to determine a spatial relation of the first reference signal resource includes: the given transmission configuration state is used to determine a spatial domain receive filter of the first reference signal resource.

In one embodiment, the given transmission state indicates a given reference signal resource, and the meaning of the phrase of a given transmission configuration state being used to determine a spatial relation of the first reference signal resource includes: the first node receives the given reference signal resource and the first reference signal resource with a same spatial domain filter.

In one embodiment, the given transmission state indicates a given reference signal resource, and the meaning of the phrase of a given transmission configuration state being used to determine a spatial relation of the first reference signal resource includes: the first node transmits the given reference signal resource and receives the first reference signal resource with a same spatial domain filter.

In one embodiment, the meaning of the phrase of a given transmission configuration state being used to determine a spatial relation of the first reference signal resource includes: the given transmission configuration state is used to determine a spatial Rx parameter of the first reference signal resource.

In one embodiment, the given transmission state indicates a given reference signal resource, and the meaning of the phrase of a given transmission configuration state being used to determine a spatial relation of the first reference signal resource includes: the first node receives the given reference signal resource and the first reference signal resource with a same spatial Rx parameter.

In one embodiment, the given transmission state indicates a given reference signal resource, and the meaning of the phrase of a given transmission configuration state being used to determine a spatial relation of the first reference signal resource includes: the first reference signal resource and the given reference signal resource are quasi co-located.

In one embodiment, the given transmission state indicates a given reference signal resource, and the meaning of the phrase of a given transmission configuration state being used to determine a spatial relation of the first reference signal resource includes: the first reference signal resource and the given reference signal resource are quasi co-located corresponding to QCL-TypeD.

In one embodiment, the given transmission state indicates a given reference signal resource, and the meaning of the phrase of a given transmission configuration state being used to determine a spatial relation of the first reference signal resource includes: large-scale properties of a channel that the given reference signal resource goes through can be used to infer large-scale properties of a channel that the first reference signal resource goes through.

In one embodiment, a channel that a reference signal resource goes through refers to: a channel that a reference signal transmitted according to configuration information of the reference signal resource goes through.

In one embodiment, a channel that a reference signal resource goes through refers to: a channel that a reference signal transmitted in the reference signal resource goes through.

In one embodiment, the given transmission configuration state indicates that a QCL type corresponding to the given reference signal resource is TypeD.

In one embodiment, the given reference signal resource comprises a CSI-RS resource.

In one embodiment, the given reference signal resource comprises an SS/PBCH Block resource.

In one embodiment, the given reference signal resource comprises an SRS resource.

Embodiment 8

Embodiment 8 illustrates a schematic diagram of whether a first information block is transmitted according to one embodiment of the present disclosure, as shown in FIG. 8. In embodiment 8, the first information block comprises a reporting for the first reporting configuration, and reference signal resources associated with the first reporting configuration comprise the first reference signal resource; if the first transmission configuration state belongs to the first transmission configuration state set, the first node transmits the first information block; otherwise, the first node drops transmitting the first information block.

In one embodiment, the first reporting configuration comprises a CSI reporting configuration.

In one embodiment, the first reporting configuration is a CSI reporting configuration.

In one embodiment, the first reporting configuration comprises information in all or partial fields in an IE.

In one embodiment, the first reporting configuration is an IE.

In one embodiment, a name of the first reporting configuration comprises "CSI-Report".

In one embodiment, the first reporting configuration comprises information in all or partial fields in a CSI-Report-Config IE.

In one embodiment, the first reporting configuration comprises a CSI-ReportConfig IE.

In one embodiment, the first reporting configuration is a CSI-ReportConfig IE.

In one embodiment, the first reporting configuration is periodic.

In one embodiment, the first reporting configuration is semi-persistent.

In one embodiment, the first reporting configuration is aperiodic.

In one embodiment, the first information block comprises a CSI reporting.

In one embodiment, the first information comprises a CSI reporting for the first reporting configuration.

In one embodiment, the first information block comprises a reporting for the first reporting configuration occurring after the first time.

In one embodiment, the first information block comprises a reporting for the first reporting configuration occurring within an application time of the first transmission configuration state.

In one embodiment, the first information block comprises a reporting for the first reporting configuration occurring after the first time and its corresponding CSI reference resources are later than an occurrence of the first reference signal resource after the first time.

In one embodiment, the first reporting configuration is periodic or semi-persistent; the first information block comprises a reporting for the first reporting configuration occurring after the first time.

In one embodiment, the first reporting configuration is periodic or semi-persistent; the first information block comprises a reporting for the first reporting configuration occurring within an application time of the first transmission configuration state.

In one embodiment, the first reporting configuration is aperiodic; the first information block comprises a reporting of a trigger for the first reporting configuration occurring after the first time.

In one embodiment, the first reporting configuration is aperiodic; the first information block comprises a reporting of a trigger of the first reporting configuration occurring within an application time of the first transmission configuration state.

In one embodiment, the first reference signal resource occurs once after the first time and before CSI reference resources corresponding to the first information block.

In one embodiment, the first information block is carried by a physical-layer signaling.

In one embodiment, the first information block comprises a CSI.

In one embodiment, the first information block comprises one or more of a Channel Quality Indicator (CQI), a Precoding Matrix Indicator (PMI), a CSI-RS Resource Indicator (CRI), a Layer Indicator (LI) or a Rank Indicator (RI).

In one embodiment, the first information block comprises one or more of a CQI, a PMI, a CRI or an RI.

In one embodiment, the first information block comprises one or more of a CQI, a PMI or an RI.

In one embodiment, the first information block does not comprise an SS/PBCH Block Resource Indicator (SSB RI), Layer 1 Reference Signal received power (L1-RSRP) and a Signal-to-Interference and Noise Ratio (L1-SINR).

In one embodiment, the first information block comprises one or more of an SSBRI, L1-RSRP or an L1-SINR.

In one embodiment, the first information block comprises Uplink control information (UCI).

In one embodiment, a reference signal resource used for a channel measurement associated with the first reporting configuration comprises the first reference signal resource.

In one embodiment, a reference signal resource indicated by a higher-layer parameter "resourcesForChannelMeasurement" of the first reporting configuration comprises the first reference signal resource.

In one embodiment, a reference signal resource indicated by a first higher-layer parameter of the first reporting configuration comprises the first reference signal resource, and a name of the first higher-layer parameter comprises "resourcesForChannelMeasurement".

In one embodiment, a reference signal resource used for an interference measurement associated with the first reporting configuration comprises the first reference signal resource.

In one embodiment, a reference signal resource indicated by a higher-layer parameter "csi-IM-ResourcesForInterference" or "nzp-CSI-RS-ResourcesForInterference" of the first reporting configuration comprises the first reference signal resource.

In one embodiment, a value of a higher-layer parameter "reportQuantity" associated with the first reporting configuration belongs to the first higher-layer parameter value set.

In one embodiment, the first reporting configuration is a CSI reporting configuration associated with the first reference signal resource.

In one embodiment, a reference signal resource associated with the first reporting configuration only comprises the first reference signal resource.

In one embodiment, a reference signal resource used for channel measurement associated with the first reporting configuration only comprises the first reference signal resource.

In one embodiment, a reference signal resource associated with the first reporting configuration comprises at least one other reference signal resource other than the first reference signal resource.

In one embodiment, a reference signal resource used for channel measurement associated with the first reporting configuration comprises at least one other reference signal resource other than the first reference signal resource.

In one embodiment, if the first node transmits the first information block, a transmission time of the first information block is after the first time.

In one embodiment, if the first node transmits the first information block, a transmission time of the first information block is later than an occurrence of the first reference signal resource after the first time.

In one subembodiment of the above embodiment, a time interval between a transmission time of the first information block and the occurrence of the first reference signal resource after the first time is not less than a first threshold, and the first threshold is measured by multicarrier symbol, slot or millisecond; the first threshold is a non-negative integer.

In one embodiment, a CSI reference resource corresponding to a CSI carried by the first information block is later than an occurrence of the first reference signal resource after the first time.

In one embodiment, if the first node transmits the first information block, a measurement performed on the first reference signal resource is used to generate the first information block.

In one embodiment, if the first node transmits the first information block, a channel measurement performed on the first reference signal resource is used to generate the first information block.

In one embodiment, if the first node transmits the first information block, an interference measurement performed on the first reference signal resource is used to generate the first information block.

In one embodiment, if the first node transmits the first information block, a measurement performed on an occurrence of the first reference signal resource after the first time is used to generate the first information block.

In one embodiment, if the first node transmits the first information block, among measurements performed on different occurrences of the first reference signal resource in time domain, only a measurement performed on an occurrence of the first reference signal resource after the first time is used to generate the first information block.

Embodiment 9

Embodiment 9 illustrates a schematic diagram of whether a measurement performed on a first reference signal resource is used to generate a second information block according to one embodiment of the present disclosure, as shown in FIG. 9. In embodiment 9, a reference signal resource associated with the second reporting configuration comprises the first reference signal resource; if the first transmission configuration state belongs to the first transmission configuration state set, the measurement performed on the first reference signal resource is used to generate the second information block; otherwise, the second information block is unrelated to the measurement performed on the first reference signal resource.

In one embodiment, the second reporting configuration comprises a CSI reporting configuration.

In one embodiment, the second reporting configuration is a CSI reporting configuration.

In one embodiment, the second reporting configuration comprises information in all or partial fields in an IE.

In one embodiment, the second reporting configuration is an IE.

In one embodiment, a name of the second reporting configuration comprises "CSI-Report".

In one embodiment, the second reporting configuration comprises information in all or partial fields in a CSI-ReportConfig IE.

In one embodiment, the second reporting configuration comprises a CSI-ReportConfig IE.

In one embodiment, the second reporting configuration is a CSI-ReportConfig IE.

In one embodiment, the second reporting configuration is periodic.

In one embodiment, the second reporting configuration is semi-persistent.

In one embodiment, the second reporting configuration is aperiodic.

In one embodiment, the second information block comprises a CSI reporting.

In one embodiment, the second information comprises a CSI reporting for the second reporting configuration.

In one embodiment, the second information block comprises a reporting for the second reporting configuration occurring after the first time.

In one embodiment, the second information block comprises a reporting for the second reporting configuration within an application time of the first transmission configuration state.

In one embodiment, the second information block comprises a reporting for the second reporting configuration occurring after the first time and its corresponding CSI reference resources are later than an occurrence of the first reference signal resource after the first time.

In one embodiment, the second reporting configuration is periodic or semi-persistent; the second information block comprises a reporting for the second reporting configuration occurring after the first time.

In one embodiment, the second reporting configuration is periodic or semi-persistent; the second information block comprises a reporting for the second reporting configuration occurring within an application time of the first transmission configuration state.

In one embodiment, the second reporting configuration is aperiodic; and the second information block comprises a reporting for a trigger for the second reporting configuration occurring after the first time.

In one embodiment, the second reporting configuration is aperiodic; the second information block comprises a reporting for a trigger of the second reporting configuration occurring within an application time of the first transmission configuration state.

In one embodiment, the first reference signal resource occurs once after the first time and before a CSI reference resource corresponding to the second information block.

In one embodiment, the second information block is carried by a physical-layer signaling.

In one embodiment, the second information block comprises one or more of a CQI, a PMI, a CRI, an L1 or an RI.

In one embodiment, the first information block comprises one or more of a CQI, a PMI, a CRI or an RI.

In one embodiment, the first information block comprises one or more of a CQI, a PMI or an RI.

In one embodiment, the first information block does not comprise an SSBRI, L1-RSRP and an L1-SINR.

In one embodiment, the first information block comprises one or more of an SSBRI, L1-RSRP or an L1-SINR.

In one embodiment, the second information block comprises UCI.

In one embodiment, a reference signal resource used for channel measurement associated with the second reporting configuration comprises the first reference signal resource.

In one embodiment, a reference signal resource indicated by a higher-layer parameter "resourcesForChannelMeasurement" of the second reporting configuration comprises the first reference signal resource.

In one embodiment, a reference signal resource indicated by a first higher-layer parameter of the second reporting configuration comprises the first reference signal resource, and a name of the first higher-level parameter comprises "resourcesForChannelMeasurement".

In one embodiment, a reference signal resource for interference measurement associated with the second reporting configuration comprises the first reference signal resource.

In one embodiment, a reference signal resource indicated by a higher-layer parameter "csi-IM-ResourcesForInterference" or "nzp-CSI-RS-ResourcesForInterference" of the second reporting configuration comprises the first reference signal resource.

In one embodiment, a value of a higher-layer parameter "reportQuantity" associated with the second reporting configuration belongs to the first higher-layer parameter value set.

In one embodiment, the second reporting configuration is a CSI reporting configuration associated with the first reference signal resource.

In one embodiment, a reference signal resource associated with the second reporting configuration comprises at least one other reference signal resource in addition to the first reference signal resource.

In one embodiment, a reference signal resource used for channel measurement associated with the second reporting configuration comprises at least one other reference signal resource in addition to the first reference signal resource.

In one embodiment, a transmission time of the second information block is after the first time.

In one embodiment, a transmission time of the second information block is later than an occurrence of the first reference signal resource after the first time.

In one subembodiment of the above embodiment, a time interval between a transmission time of the second information block and the occurrence of the first reference signal resource after the first time is not less than a first threshold, and the first threshold is measure by multicarrier symbol, slot or millisecond; the first threshold is a non-negative integer.

In one embodiment, a CSI reference resource corresponding to a CSI carried by the second information block is later than an occurrence of the first reference signal resource after the first time.

In one embodiment, if the first transmission configuration state belongs to the first transmission configuration state set, a measurement performed on an occurrence of the first reference signal resource after the first time is used to generate the second information block.

In one embodiment, if the first transmission configuration state belongs to the first transmission configuration state set, among measurements performed on different occurrences of the first reference signal resource in time domain, only a measurement performed on an occurrence of the first reference signal resource after the first time is used to generate the second information block.

In one embodiment, the meaning of the phrase of a measurement performed on the first reference signal resource being used to generate a given information block includes: the first node will obtain a channel measurement used for calculating a CSI value reported in the given information block based on the first reference signal resource; the given information block is the first information block or the second information block.

In one embodiment, the meaning of the phrase of a measurement performed on the first reference signal resource being used to generate a given information block includes: the first node will obtain an interference measurement used for calculating a CSI value reported in the given information block based on the first reference signal resource; the given information block is the first information block or the second information block.

In one embodiment, the meaning of the phrase of a measurement performed on the first reference signal resource being used to generate a given information block includes: a measurement performed on the first reference signal resource is used to determine a first channel matrix, and the first channel matrix is used to calculate a CSI reported in the given information block; the given information block is the first information block or the second information block.

In one embodiment, the meaning of the phrase of a measurement performed on the first reference signal resource being used to generate a given information block includes: the given information block comprises L1-RSRP or an L1-SINR of the first reference signal resource; the given information block is the first information block or the second information block.

In one embodiment, reference signal resources associated with the second reporting configuration comprises S reference signal resources, S being a positive integer greater than 1, and the first reference signal resource is one of the S reference signal resources; a measurement performed on a reference signal resource in only a first reference signal resource subset among the S reference signal resources is used to generate the second information block; the first reference signal resource subset comprises at least one reference signal resource among the S reference signal resources; and the first transmission configuration state is used to determine the first reference signal resource subset out of the S reference signal resources.

In one subembodiment of the above embodiment, if the first transmission configuration state belongs to the first transmission configuration state set, the first reference signal resource belongs to the first reference signal resource subset; otherwise, the first reference signal resource does not belong to the first reference signal resource subset.

In one subembodiment of the above embodiment, the second information block is unrelated to a measurement performed on any reference signal resource not belonging to the first reference signal resource subset among the S reference signal resources.

In one subembodiment of the above embodiment, any of the S reference signal resources is a CSI-RS resource.

In one subembodiment of the above embodiment, there exists one of the S reference signal resources being an SS/PBCH block resource.

In one subembodiment of the above embodiment, any reference signal resource in the first reference signal resource subset and a reference signal indicated by the first transmission configuration state are quasi co-located.

In one subembodiment of the above embodiment, the S reference signal resources respectively correspond to S transmission configuration state sets, and any transmission configuration state set in the S transmission configuration state sets comprises at least one transmission configuration state; a transmission configuration state set corresponding to any reference signal resource in the first reference signal resource subset comprises the first transmission configuration state.

In one subembodiment of the above embodiment, the first transmission configuration state is used to determine a spatial relation of each reference signal resource in the first reference signal resource subset.

Embodiment 10

Embodiment 10 illustrates a schematic diagram of a first signal according to one embodiment of the present disclosure, as shown in FIG. 10. In embodiment 10, the first signal carries a HARQ-ACK associated with the first signaling.

In one embodiment, the first signal comprises a baseband signal.

In one embodiment, the first signal comprises a radio signal.

In one embodiment, the first signal comprises a radio-frequency signal.

In one embodiment, the first signal comprises Uplink control information (UCI).

In one embodiment, the HARQ-ACK refers to: Hybrid Automatic Repeat request-Acknowledgement.

In one embodiment, the HARQ-ACK comprises an ACK.

In one embodiment, the HARQ-ACK comprises a Negative ACKnowledgement (NACK).

In one embodiment, the HARQ-ACK associated with the first signaling only comprises an ACK.

In one embodiment, the HARQ-ACK associated with the first signaling comprises an ACK or a NACK.

In one embodiment, the HARQ-ACK associated with the first signaling comprises: a HARQ-ACK for the first signaling.

In one embodiment, the HARQ-ACK associated with the first signaling comprises: a HARQ-ACK of a PDSCH scheduled for the first signaling.

In one embodiment, the HARQ-ACK associated with the first signaling indicates whether the first signaling is correctly received.

In one embodiment, the HARQ-ACK associated with the first signaling indicates that the first signaling is correctly received.

In one embodiment, the HARQ-ACK associated with the first signaling is used by a transmitter of the first signaling to determine whether the first signaling is correctly received.

In one embodiment, the HARQ-ACK associated with the first signaling is used by a transmitter of the first signaling to determine that the first signaling is correctly received.

In one embodiment, if a transmitter of the first signaling receives the first signal, the transmitter of the first signaling assumes that the first signaling is correctly received.

In one embodiment, if a transmitter of the first signaling does not receive the first signal, the transmitter of the first signaling assumes that the first signaling is not correctly received.

In one embodiment, the first signal is later than the first signaling in time domain.

In one embodiment, the first signaling indicates time-domain resources occupied by the first signal.

In one embodiment, the first signaling indicates a time interval between time-domain resources occupied by the first signal and time-domain resources occupied by the first signaling.

In one embodiment, a spatial domain transmission filter of the first signal is unrelated to the first transmission configuration state.

In one embodiment, a spatial domain transmission filter of the first signal is unrelated to the first transmission configuration state and the second transmission configuration state.

In one embodiment, the first transmission configuration state is used to determine a spatial domain transmission filter of the first signal.

In one embodiment, the second transmission configuration state is used to determine a spatial domain transmission filter of the first signal.

Embodiment 11

Embodiment 11 illustrates a schematic diagram of a first signaling and a second signal according to one embodiment of the present disclosure, as shown in FIG. 11. In embodiment 11, the first signaling comprises scheduling information of the second signal.

In one embodiment, the second signal carries at least one of a Transport Block (TB), a Code Block (CB) or a Code Block Group (CBG).

In one embodiment, the scheduling information comprises one or more of time-domain resources, frequency-domain resources, a Modulation and Coding Scheme (MCS), a DeModulation Reference Signals (DMRS) port, a Hybrid Automatic Repeat reQuest (HARQ) process number, a Redundancy Version (RV), or a New Data Indicator (NDI).

In one embodiment, the second signal comprises a baseband signal.

In one embodiment, the second signal comprises a radio signal.

In one embodiment, the second signal comprises a radio-frequency signal.

In one embodiment, the HARQ-ACK associated with the first signaling includes: a HARQ-ACK for the second signal.

In one embodiment, the HARQ-ACK associated with the first signaling includes: a HARQ-ACK for a TB or a CBG carried by the second signal.

In one embodiment, the HARQ-ACK associated with the first signaling indicates whether the second signaling is correctly received.

In one embodiment, the HARQ-ACK associated with the first signaling indicates whether a TB or a CBG carried by the second signal is correctly received.

In one embodiment, the HARQ-ACK associated with the first signaling indicates that the second signal is correctly received.

In one embodiment, the HARQ-ACK associated with the first signaling indicates that a TB or a CBG carried by the second signal is correctly received.

In one embodiment, the first signal is later than the second signal in time domain.

In one embodiment, the first signaling indicates time-domain resources occupied by the second signal, and the first signaling indicates a time interval between time-domain resources occupied by the first signal and time-domain resources occupied by the second signal.

In one embodiment, a TCI state of the second signal is different from the first transmission configuration state.

In one embodiment, a TCI state of the second signal is the first transmission configuration state.

In one embodiment, a TCI state of the second signal is the second transmission configuration state.

Embodiment 12

Embodiment 12 illustrates a schematic diagram of a first parameter value set being related to whether a first transmission configuration state belongs to a first transmission configuration state set according to one embodiment of the present disclosure, as shown in FIG. 12. In embodiment 12, the first configuration information block indicates the M parameter value sets; after the first time, the first parameter value set indicates at least one of frequency-domain resources, time-domain resources, density, period or a number of port(s) of the first reference signal resource; if the first transmission configuration state belongs to the first transmission configuration state set, the first transmission configuration state is used by the first node to determine the first parameter value set out of the M parameter value sets; otherwise, the second transmission configuration state is used by the first node to determine the first parameter value set out of the M parameter value sets;

In one embodiment, the density of the first reference signal resource refers to: frequency-domain density.

In one embodiment, the density of the first reference signal resource refers to a number of times that any reference signal port of the first reference signal resource occurs in a Physical Resource block (PRB).

In one embodiment, the number of port(s) of the first reference signal resource refers to a number of CSI-RS port(s) configured for the first reference signal resource.

In one embodiment, the time-domain resources of the first reference signal resource refer to a number and a position of multicarrier symbol(s) occupied by the first reference signal resource in a slot.

In one embodiment, the first configuration information block comprises the M parameter value sets.

In one embodiment, the configuration information of the first reference signal resource comprises the M parameter value sets.

In one embodiment, M is equal to a number of transmission configuration state(s) comprised in the first transmission configuration state set.

In one embodiment, M is equal to a number of transmission configuration state(s) comprised in the first transmission configuration state set, and all transmission configuration state(s) comprised in the first transmission configuration state set corresponds (respectively correspond) to the M parameter value sets.

In one embodiment, a corresponding relation between a transmission configuration state in the first transmission configuration state set and the M parameter value sets is determined by the first configuration information block.

In one embodiment, M is equal to T, and the T transmission configuration states respectively correspond to the M parameter value sets.

In one embodiment, a corresponding relation between T transmission configuration states and the M parameter value sets is determined by the first configuration information block.

In one embodiment, M is not greater than a number of transmission configuration state(s) comprised in the first transmission configuration state set.

In one embodiment, any transmission configuration state in the first transmission configuration state set corresponds to one and only one of the M parameter value sets, and any parameter value set in the M parameter value sets corresponds to a transmission configuration state in the first transmission configuration state set.

In one embodiment, there exists one of the M parameter value sets corresponding to a plurality of transmission configuration states in the first transmission configuration state set.

In one embodiment, M is not greater than T.

In one embodiment, any of the T transmission configuration states corresponds to one and only one of the M parameter value sets, and any of the M parameter value sets corresponds to one of the T transmission configuration states.

In one embodiment, there exists one of the M parameter value sets corresponding to a plurality of transmission configuration states in the T transmission configuration states.

In one embodiment, any transmission configuration state in the first transmission configuration state set corresponds to a third-type index, and the M parameter value sets respectively correspond to M third-type indexes; any transmission configuration state in the first transmission configuration state set corresponds to one of the M parameter value set corresponding to a same third-type index.

In one embodiment, any of the T transmission configuration states corresponds to a third type index, and the M parameter value sets respectively correspond to M third-type indexes; any of the T transmission configuration states corresponds to one of the M parameter value set corresponding to a same third-type index.

In one embodiment, any two of the M third-type indexes are not equal to each other.

In one embodiment, the third-type index is a non-negative integer.

In one embodiment, a corresponding relation between the M parameter value sets and the M third-type indexes is configured by a higher-layer signaling.

In one embodiment, a reference signal resource indicated by a transmission configuration state is used to determine a third-type index corresponding to the transmission configuration state.

In one embodiment, if the first transmission configuration state belongs to the first transmission configuration state set, the first parameter value set is one of the M parameter value sets corresponding to the first transmission configuration state; otherwise, the first parameter value set is one of the M parameter value sets corresponding to the second transmission configuration state.

In one embodiment, there exist two same parameter value sets among the M parameter value sets.

In one embodiment, any two of the M parameter value sets are different from each other.

In one embodiment, any of the M parameter value sets comprises at least one higher-layer parameter value.

In one embodiment, any of the M parameter value sets comprises a value of at least one of higher-layer parameters "nrofPorts", "frequencyDomainAllocation", "density", "freqBand" or "periodicityAndOffset".

In one embodiment, the first parameter value set is one of the M parameter value sets.

In one embodiment, the first parameter value set comprises a value of a higher-layer parameter "frequencyDomainAllocation" or "freqBand"; after the first time, the first parameter value set indicates frequency-domain resources of the first reference signal resource.

In one embodiment, the first parameter value set comprises a value of a higher-layer parameter "nrofPorts"; after the first time, the first parameter value set indicates a number of ports of the first reference signal resource.

In one embodiment, the first parameter value set comprises a value of a higher-layer parameter "density"; after the first time, the first parameter value set indicates a density of the first reference signal resource.

In one embodiment, the first parameter value set comprises a value of a higher-layer parameter "periodicityAndOffset"; after the first time, the first parameter value set indicates a period of the first reference signal resource.

In one embodiment, if the first transmission configuration state belongs to the first transmission configuration state set, at least one of frequency-domain resources, time-domain resources, density, period or a number of port(s) of the first reference signal resource is different before and after the first time.

In one embodiment, if the first transmission configuration state belongs to the first transmission configuration state set, a density of the first reference signal resource is different before and after the first time.

In one embodiment, if the first transmission configuration state belongs to the first transmission configuration state set, a number of ports of the first reference signal resource is different before and after the first time.

In one embodiment, if the first transmission configuration state belongs to the first transmission configuration state set, a period of the first reference signal resource is different before and after the first time.

In one embodiment, if the first transmission configuration state belongs to the first transmission configuration state set, frequency-domain resources of the first reference signal resource are different before and after the first time.

In one embodiment, before the first time, a second parameter value set indicates at least one of frequency-domain resources, time-domain resources, density, period or a number of port(s) of the first reference signal resource; the second parameter value set is one of the M parameter value sets, the second parameter value set is one of the M parameter value sets corresponding to the second transmission configuration state.

In one embodiment, the first reference signal resource occurs multiple times in time domain, and there exist at least one of frequency-domain resources, time-domain resources, density or a number of ports corresponding to two of the multiple occurrences being different; at least one of frequency-domain resources, time-domain resources, density or a number of port(s) corresponding to any of the multiple occurrences is related to a TCI state corresponding to the any occurrence.

Embodiment 13

Embodiment 13 illustrates a schematic diagram of a second configuration information block according to one embodiment of the present disclosure, as shown in FIG. 13. In embodiment 13, the second configuration information block is used to determine the N transmission configuration states; the first signaling indicates the first transmission configuration state out of the N transmission configuration states.

In one embodiment, the second configuration information block is carried by a higher-layer signaling.

In one embodiment, the second configuration information block is carried by an RRC signaling.

In one embodiment, the second configuration information block is carried by a MAC CE signaling.

In one embodiment, the second configuration information block is carried by an RRC signaling and a MAC CE together.

In one embodiment, the second configuration information block comprises information in all or partial fields in a IE.

In one embodiment, the second configuration information block is an IE.

In one embodiment, the second configuration information block is carried by at least one IE.

In one embodiment, the second configuration information block is carried by an IE and a MAC CE together.

In one embodiment, the second configuration information block is carried by at least one IE and at least one MAC CE together.

In one embodiment, the second configuration information block comprises information in a second field in a first IE; and a name of the first IE comprises "PDSCH-Config", and a name of the second field comprises "tci-StatesToAddModList".

In one embodiment, the second configuration information block comprises information in a first MAC CE; and a name of the first MAC CE comprises "TCI States Activation/Deactivation".

In one embodiment, N is a positive integer not greater than 8.

In one embodiment, N is a positive integer not greater than 64.

In one embodiment, the N transmission configuration states are all for a same BWP.

In one embodiment, the second configuration information block indicates the N transmission configuration states.

In one embodiment, any transmission configuration state in the first transmission configuration state set is one of the N transmission configuration states.

In one embodiment, any of the T transmission configuration states is one of the N transmission configuration states.

In one embodiment, the first transmission configuration state is one of the N transmission configuration states.

In one embodiment, the second transmission configuration state is one of the N transmission configuration states.

In one embodiment, the first configuration information block indicates an index of each transmission configuration state of the first transmission configuration state set in the N transmission configuration states.

In one embodiment, the first configuration information block indicates an index of each of the T transmission configuration states in the N transmission configuration states.

In one embodiment, any of the N transmission configuration states corresponds to the first-type index.

In one embodiment, the first transmission configuration state set comprises all transmission configuration states whose corresponding first-type indexes being equal to the first index among the N transmission configuration states.

In one embodiment, the first transmission configuration state set consist of all transmission configuration states whose corresponding first-type indexes being equal to the first index among the N transmission configuration states.

In one embodiment, the T transmission configuration states consist of all transmission configuration states whose corresponding first-type indexes being equal to the first index among the N transmission configuration states.

In one embodiment, any of the N transmission configuration states corresponds to the second-type index.

In one embodiment, the first transmission configuration state set comprises all transmission configuration states whose corresponding second-type indexes being equal to a second index among the N transmission configuration states.

In one embodiment, the first transmission configuration state set consists of all transmission configuration states whose corresponding second-type indexes being equal to the second index among the N transmission configuration states.

In one embodiment, the T transmission configuration states consist of all transmission configuration state whose corresponding second-type indexes being equal to the second index among the N transmission configuration states.

In one embodiment, a first transmission configuration state group is a subset of the N transmission configuration states.

In one subembodiment of the above embodiment, a reference signal indicated by any transmission configuration state in the first transmission configuration state group and a reference signal indicated by the target transmission configuration state are QCL.

In one subembodiment of the above embodiment, a reference signal indicated by any transmission configuration state in the first transmission configuration state group and a reference signal indicated by the target transmission configuration state are QCL corresponding to QCL-TypeD.

In one subembodiment of the above embodiment, a reference signal with a corresponding QCL type of TypeD indicated by any transmission configuration state in the first transmission configuration state group and a reference signal with a corresponding QCL type of TypeD indicated by the target transmission configuration state are QCL.

In one subembodiment of the above embodiment, a reference signal with a corresponding QCL type of TypeD indicated by any transmission configuration state in the first transmission configuration state group and a reference signal with a corresponding QCL type of TypeD indicated by the target transmission configuration state are QCL corresponding to QCL-TypeD.

In one subembodiment of the above embodiment, the first transmission configuration state set is the first transmission configuration state group.

In one subembodiment of the above embodiment, the T transmission configuration states are the first transmission configuration state group.

In one embodiment, the second configuration information block comprises a first information sub-block and a second information sub-block; the first information sub-block indicates N1 transmission configuration statess, N1 being a positive integer not greater than N; the second information sub-block indicates the N transmission configuration states out of the N1 transmission configuration states.

In one subembodiment of the above embodiment, the N1 transmission configuration states are all for a same BWP.

In one subembodiment of the above embodiment, the first information sub-block is carried by an IE, and the second information sub-block is carried by a MAC CE.

In one subembodiment of the above embodiment, any transmission configuration state in the first transmission configuration state set is one of the N1 transmission configuration states, and the first configuration information block indicates an index of each transmission configuration state of the first transmission configuration state set in the N1 transmission configuration states.

In one subembodiment of the above embodiment, any transmission configuration state in the T transmission configuration states is one of the N1 transmission configuration states, and the first configuration information block indicates an index of each transmission configuration state of T transmission configuration states in the N1 transmission configuration states.

In one subembodiment of the above embodiment, any of the N1 transmission configuration states corresponds to the first-type index; the first transmission configuration state set consists of all transmission configuration states whose corresponding first-type indexes being equal to the first index among the N transmission configuration states.

In one subembodiment of the above embodiment, any of the N1 transmission configuration states corresponds to the first-type index; the T transmission configuration states consist of all transmission configuration states whose corresponding first-type indexes being equal to the first index among the N transmission configuration states.

In one subembodiment of the above embodiment, any of the N1 transmission configuration states corresponds to the second-type index; the first transmission configuration state set consists of all transmission configuration states whose corresponding second-type indexes being equal to the second index among the N transmission configuration states.

In one subembodiment of the above embodiment, any of the N1 transmission configuration states corresponds to the second-type index; the T transmission configuration states consist of all transmission configuration states whose corresponding second-type indexes being equal to the second index among the N transmission configuration states.

In one subembodiment of the above embodiment, a first transmission configuration state group is a subset of the N1 transmission configuration states; a reference signal indicated by any transmission configuration state in the first transmission configuration state group and a reference signal indicated by the target transmission configuration state are QCL.

In one reference embodiment of the above subembodiment, a reference signal indicated by any transmission configuration state in the first transmission configuration state group and a reference signal indicated by the target transmission configuration state are QCL corresponding to QCL-TypeD.

In one reference embodiment of the above subembodiment, a reference signal with a corresponding QCL type of TypeD indicated by any transmission configuration state in the first transmission configuration state group and a reference signal with a corresponding QCL type of TypeD indicated by the target transmission configuration state are QCL.

In one reference embodiment of the above subembodiment, a reference signal with a corresponding QCL type of TypeD indicated by any transmission configuration state in the first transmission configuration state group and a reference signal with a corresponding QCL type of TypeD indicated by the target transmission configuration state are QCL corresponding to QCL-TypeD.

In one reference embodiment of the above subembodiment, the first transmission configuration state set is the first transmission configuration state group.

In one reference embodiment of the above subembodiment, the T transmission configuration states is the first transmission configuration state group.

In one embodiment, the first field in the first signaling indicates the first transmission configuration state out of the N transmission configuration states; a value of N is used to determine a number of bits comprised in the field in the signaling.

In one subembodiment of the above embodiment, a number of bit(s) comprised in the first field in the first signaling is equal to a minimum positive integer not less than a first value, and the first value is equal to is equal to the base 2 logarithm of N.

Embodiment 14

Embodiment 14 illustrates a structure block diagram of a processing device in a first node according to one embodiment of the present disclosure, as shown in FIG. 14. In FIG. 14, a processing device 1400 in a device in the first node comprises a first processor 1401.

In embodiment 14, the first processor 1402 receives a first configuration information block, receives a first signaling, and receives a first reference signal resource.

In embodiment 14, the first configuration information block comprises configuration information of the first reference signal resource; the first signaling indicates a first transmission configuration state; the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

In one embodiment, the first processor 1401 transmits a first information block, or drops transmitting the first information block; herein, the first information block comprises a reporting for a first reporting configuration, and reference signal resources associated with the first reporting configuration comprise the first reference signal resource; whether the first node transmits the first information block is related to whether the first transmission configuration state belongs to the first transmission configuration state set; if the first transmission configuration state belongs to the first transmission configuration state set, the first node transmits the first information block; and if the first transmission configuration state does not belong to the first transmission configuration state set, the first node drops transmitting the first information block.

In one embodiment, if the first processor 1401 drops transmitting the first information block, and the first node drops transmitting the first information block.

In one embodiment, if the first node drops transmitting the first information block, the first processor 1401 drops transmitting the first information block.

In one embodiment, the first processor 1401 transmits a second information block, the second information block comprises a reporting for a second reporting configuration; herein, reference signal resources associated with the second reporting configuration comprise the first reference signal resource, and whether a measurement performed on the first reference signal resource is used to generate the second information block is related to whether the first transmission configuration state belongs to the first transmission configuration state set; if the first transmission configuration state belongs to the first transmission configuration state set, the measurement performed on the first reference signal resource is used to generate the second information block; if the first transmission configuration state does not belong to the first transmission configuration state set, the second information block is unrelated to the measurement performed on the first reference signal resource.

In one embodiment, the first processor 1401 transmits a first signal; herein, the first signal carries a HARQ-ACK associated with the first signaling.

In one embodiment, the first processor 1401 receives a second signal; herein, the first signaling comprises scheduling information of the second signal.

In one embodiment, the first configuration information block indicates M parameter value sets, M being a positive integer greater than 1; after the first time, a first parameter value set indicates at least one of frequency-domain resources, time-domain resources, density, period or a number of port(s) of the first reference signal resource; the first parameter value set is related to whether the first transmission configuration state belongs to the first transmission configuration state set; if the first transmission configuration state belongs to the first transmission configuration state set, the first transmission configuration state is used to determine the first parameter value set out of the M parameter value sets; and if the first transmission configuration state does not belong to the first transmission configuration state set, the second transmission configuration state is used to determine the first parameter value set out of the M parameter value sets.

In one embodiment, the first processor 1401 receives a second configuration information block; herein, the second configuration information block is used to determine N transmission configuration states, N being a positive integer greater than 1; the first signaling indicates the first transmission configuration state out of the N transmission configuration states.

In one embodiment, a device in the first node is a UE.

In one embodiment, a device in the first node is a relay node.

In one embodiment, the first processor 1401 comprises at least one of the antenna 452, the receiver/transmitter 454, the receiving processor 456, the transmitting processor 468, the multi-antenna receiving processor 458, the multi-antenna transmitting processor 457, the controller/processor 459, the memory 460 or the data source 467 in embodiment 4.

Embodiment 15

Embodiment 15 illustrates a structure block diagram of a processing device in a second node according to one embodiment of the present disclosure, as shown in FIG. 15.

In FIG. 15, a processing device 1500 in a device in the second node comprises a second processor 1501.

In embodiment 15, the second processor 1501 transmits a first configuration information block, transmits a first signaling, and transmits a first reference signal resource.

In embodiment 15, the first configuration information block comprises configuration information of a first reference signal resource; the first signaling indicates a first transmission configuration state; the first configuration information block is used to determine a first transmission configuration state set, and the first transmission configuration state set comprises at least one transmission configuration state; the first signaling is used to determine a first time; a second transmission configuration state is used to determine a spatial relation of the first reference signal resource before the first time; the spatial relation of the first reference signal resource is related to whether the first transmission configuration state belongs to the first transmission configuration state set after the first time; when the first transmission configuration state belongs to the first transmission configuration state set, the first transmission configuration state is used to determine the spatial relation of the first reference signal resource after the first time; and when the first transmission configuration state does not belong to the first transmission configuration state set, the second transmission configuration state is used to determine the spatial relation of the first reference signal resource after the first time.

In one embodiment, the second processor 1501 receives a first information block, or drops receiving the first information block; herein, the first information block comprises a reporting for a first reporting configuration, and reference signal resources associated with the first reporting configuration comprise the first reference signal resource; whether a transmitter of the first information block transmits the first information block is related to whether the first transmission configuration state belongs to the first transmission configuration state set; if the first transmission configuration state belongs to the first transmission configuration state set, the transmitter of the first information block transmits the first information block; and if the first transmission configuration state does not belong to the first transmission configuration state set, the transmitter of the first information block drops transmitting the first information block, In one embodiment, if the first transmission configuration state belongs to the first transmission configuration state set, the second processor 1501 receives the first information block; otherwise, the second processor 1501 drops receiving the first information block.

In one embodiment, the second processor 1501 receives a second information block, and the second information block comprises a reporting for the second reporting configuration; herein, reference signal resources associated with the second reporting configuration comprise the first reference signal resource, and whether a measurement performed on the first reference signal resource is used to generate the second information block is related to whether the first transmission configuration state belongs to the first transmission configuration state set; if the first transmission configuration state belongs to the first transmission configuration state set, the measurement performed on the first reference signal resource is used to generate the second information block; if the first transmission configuration state does not belong to the first transmission configuration state set, the second information block is unrelated to the measurement performed on the first reference signal resource.

In one embodiment, the second processor 1501 receives a first signal; herein, the first signal carries a HARQ-ACK associated with the first signaling.

In one embodiment, the second processor 1501 transmits a second signal; herein, the first signaling comprises scheduling information of the second signal.

In one embodiment, the first configuration information block indicates M parameter value sets, M being a positive integer greater than 1; after the first time, a first parameter value set indicates at least one of frequency-domain resources, time-domain resources, density, period or a number of port(s) of the first reference signal resource; the first parameter value set is related to whether the first transmission configuration state belongs to the first transmission configuration state set; if the first transmission configuration state belongs to the first transmission configuration state set, the first transmission configuration state is used to determine the first parameter value set out of the M parameter value sets; and if the first transmission configuration state does not belong to the first transmission configuration state set, the second transmission configuration state is used to determine the first parameter value set out of the M parameter value sets.

In one embodiment, the second processor 1501 transmits a second configuration information block; herein, the second configuration information block is used to determine N transmission configuration states, N being a positive integer greater than 1; the first signaling indicates the first transmission configuration state out of the N transmission configuration states.

In one embodiment, a device in the second node is a base station.

In one embodiment, a device in the second node is a UE.

In one embodiment, a device in the second node is a relay node.

In one embodiment, the second processor 1501 comprises at least one of the antenna 420, the receiver/transmitter 418, the receiving processor 470, the transmitting processor 416, the multi-antenna receiving processor 472, the multi-antenna transmitting processor 471, the controller/processor 475, or the memory 476 in embodiment 4.

The ordinary skill in the art may understand that all or part of steps in the above method may be implemented by instructing related hardware through a program. The program may be stored in a computer readable storage medium, for example Read-Only Memory (ROM), hard disk or compact disc, etc. Optionally, all or part of steps in the above embodiments also may be implemented by one or more integrated circuits. Correspondingly, each module unit in the above embodiment may be realized in the form of hardware, or in the form of software function modules. The user equipment, terminal and UE include but are not limited to Unmanned Aerial Vehicles (UAVs), communication modules on UAVs, telecontrolled aircrafts, aircrafts, diminutive airplanes, mobile phones, tablet computers, notebooks, vehicle-mounted communication equipment, vehicles, cars, RSUs, wireless sensors, network cards, Internet of Things (IoT) terminals, RFID terminals, NB-IOT terminals, Machine Type Communication (MTC) terminals, enhanced MTC (eMTC) terminals, data card, network cards, vehicle-mounted communication equipment, low-cost mobile phones, low-cost tablets and other wireless communication devices. The base station or system equipment in the present disclosure includes but is not limited to macro-cellular base stations, micro-cellular base stations, Pico base stations, home base stations, relay base stations, eNB, gNB, Transmitter Receiver Points (TRPs), GNSS, relay satellites, satellite base stations, space base stations, RSUs, UAVs, test devices, such as a transceiver or a signaling tester that simulates some functions of a base station, and other wireless communication devices.

The above are merely the preferred embodiments of the present disclosure and are not intended to limit the scope of protection of the present disclosure. Any modification, equivalent substitute and improvement made within the spirit and principle of the present disclosure are intended to be included within the scope of protection of the present disclosure.

What is claimed is:

1. A user equipment (UE) for wireless communications, the UE comprising:

a transceiver; and a processor, wherein the transceiver and the processor are configured to:

receive a first configuration information block, wherein the first configuration information block comprises configuration information of a first reference signal resource, receive a first signaling, wherein the first signaling indicates a first transmission configuration state, and receive the first reference signal resource, wherein the first configuration information block is used to determine a first transmission configuration state set, and the first transmission configuration state set comprises at least one transmission configuration state; and wherein the first signaling is used to determine a first time, and wherein a second transmission configuration state is used to determine a spatial relation of the first reference signal resource before the first time, and wherein the spatial relation of the first reference signal resource is related to whether the first transmission configuration state belongs to the first transmission configuration state set after the first time, and wherein on a condition that the first transmission configuration state belongs to the first transmission configuration state set, the first transmission configuration state is used to determine the spatial relation of the first reference signal resource after the first time, and wherein on a condition that the first transmission configuration state does not belong to the first transmission configuration state set, the second transmission configuration state is used to determine the spatial relation of the first reference signal resource after the first time.

2. The UE according to claim 1, wherein the transceiver and the processor are further configured to:

transmits a first information block, or, drops transmitting the first information block, wherein the first information block comprises a reporting for a first reporting configuration, and reference signal resources associated with the first reporting configuration comprise the first reference signal resource, and wherein whether the UE transmits the first information block is related to whether the first transmission configuration state belongs to the first transmission configuration state set, and wherein on a condition that the first transmission configuration state belongs to the first transmission configuration state set, the UE transmits the first information block, and wherein if on a condition that the first transmission configuration state does not belong to the first transmission configuration state set, the UE drops transmitting the first information block.

3. The UE according to claim 1, wherein the transceiver and the processor are further configured to:

transmit a second information block, wherein the second information block comprises a reporting for a second reporting configuration, and wherein reference signal resources associated with the second reporting configuration comprise the first reference signal resource, and whether a measurement performed on the first reference signal resource is used to generate the second information block is related to whether the first transmission configuration state belongs to the first transmission configuration state set, and wherein on a condition that the first transmission configuration state belongs to the first transmission configuration state set, the measurement performed on the first reference signal resource is used to generate the second information block, and wherein on a condition that the first transmission configuration state does not belong to the first transmission configuration state set, the second information block is unrelated to the measurement performed on the first reference signal resource.

4. The UE according to claim 1, wherein the transceiver and the processor are further configured to:

transmits a first signal, wherein the first signal carries a HARQ-ACK associated with the first signaling.

5. The UE according to claim 1, wherein the transceiver and the processor are further configured to:

receives a second signal, wherein the first signaling comprises scheduling information of the second signal.

6. The UE according to claim 1, wherein the first configuration information block indicates M reference value sets, M being a positive integer greater than 1, and wherein after the first time, a first parameter value set indicates at least one of frequency-domain resources, time-domain resources, density, period or a number of port(s) of the first reference signal resource, and wherein the first parameter value set is related to whether the first transmission configuration state belongs to the first transmission configuration state set, and wherein on a condition that the first transmission configuration state belongs to the first transmission configuration state set, the first transmission configuration state is used to determine the first parameter value set out of the M parameter value sets, and wherein on a condition that the first transmission configuration state does not belong to the first transmission configuration state set, the second transmission configuration state is used to determine the first parameter value set out of the M parameter value sets.

7. The UE according to claim 1, wherein the transceiver and the processor are further configured to:

receives a second configuration information block, wherein the second configuration information block is used to determine N transmission configuration states, N being a positive integer greater than 1, and wherein the first signaling indicates the first transmission configuration state out of the N transmission configuration states.

8. A base station for wireless communications, the base station comprising:

a transceiver; and a processor, wherein the transceiver and the processor are configured to:

transmit a first configuration information block, wherein the first configuration information block comprises configuration information of a first reference signal resource, transmit a first signaling, wherein the first signaling indicates a first transmission configuration state, and transmit the first reference signal resource, wherein the first configuration information block is used to determine a first transmission configuration state set, and the first transmission configuration state set comprises at least one transmission configuration state, and wherein the first signaling is used to determine a first time, and wherein a second transmission configuration state is used to determine a spatial relation of the first reference signal resource before the first time, and wherein the spatial relation of the first reference signal resource is related to whether the first transmission configuration state belongs to the first transmission configuration state set after the first time, and wherein on a condition that the first transmission configuration state belongs to the first transmission configuration state set, the first transmission configuration state is used to determine the spatial relation of the first reference signal resource after the first time, and wherein on a condition that the first transmission configuration state does not belong to the first transmission configuration state set, the second transmission configuration state is used to determine the spatial relation of the first reference signal resource after the first time.

9. The base station according to claim 8, wherein the transceiver and the processor are further configured to:

receives a first information block, or, drops receiving the first information block, wherein the first information block comprises a reporting for a first reporting configuration, and reference signal resources associated with the first reporting configuration comprise the first reference signal resource, and wherein whether a transmitter of the first information block transmits the first information block is related to whether the first transmission configuration state belongs to the first transmission configuration state set, and wherein on a condition that the first transmission configuration state belongs to the first transmission configuration state set, the transmitter of the first information block transmits the first information block, and wherein on a condition that if the first transmission configuration state does not belong to the first transmission configuration state set, the transmitter of the first information block drops transmitting the first information block.

10. The base station according to claim 8, wherein the transceiver and the processor are further configured to:

receive a second information block, wherein the second information block comprises a reporting for a second reporting configuration, and wherein reference signal resources associated with the second reporting configuration comprise the first reference signal resource, and whether a measurement performed on the first reference signal resource is used to generate the second information block is related to whether the first transmission configuration state belongs to the first transmission configuration state set, and wherein on a condition that the first transmission configuration state belongs to the first transmission configuration state set, the measurement performed on the first reference signal resource is used to generate the second information block, and wherein on a condition that the first transmission configuration state does not belong to the first transmission configuration state set, the second information block is unrelated to the measurement performed on the first reference signal resource.

11. The base station according to claim 8, wherein the transceiver and the processor are further configured to:

receives a first signal, wherein the first signal carries a HARQ-ACK associated with the first signaling.

12. The base station according to claim 8, wherein the transceiver and the processor are further configured to:

transmits a second signal, wherein the first signaling comprises scheduling information of the second signal.

13. The base station according to claim 8, wherein the first configuration information block indicates M parameter value sets, M being a positive integer greater than 1, and wherein after the first time, a first parameter value set indicates at least one of frequency-domain resources, time-domain resources, density, period or a number of ports of the first reference signal resource, and wherein the first parameter value set is related to whether the first transmission configuration state belongs to the first transmission configuration state set, and wherein on a condition that the first transmission configuration state belongs to the first transmission configuration state set, the first transmission configuration state is used to determine the first parameter value set out of the M parameter value sets, and wherein on a condition that the first transmission configuration state does not belong to the first transmission configuration state set, the second transmission configuration state is used to determine the first parameter value set out of the M parameter value sets.

14. The base station according to claim 8, wherein the transceiver and the processor are further configured to:

transmits a second configuration information block, wherein the second configuration information block is used to determine N transmission configuration states, N being a positive integer greater than 1, and wherein the first signaling indicates the first transmission configuration state out of the N transmission configuration states.

15. A method in a user equipment (UE) for wireless communications, the method comprising:

receiving a first configuration information block, wherein the first configuration information block comprises configuration information of a first reference signal resource;

receiving a first signaling, wherein the first signaling indicates a first transmission configuration state; and receiving the first reference signal resource, wherein the first configuration information block is used to determine a first transmission configuration state set, and the first transmission configuration state set comprises at least one transmission configuration state, and wherein the first signaling is used to determine a first time, and wherein a second transmission configuration state is used to determine a spatial relation of the first reference signal resource before the first time, and wherein the spatial relation of the first reference signal resource is related to whether the first transmission configuration state belongs to the first transmission configuration state set after the first time, and wherein on a condition that the first transmission configuration state belongs to the first transmission configuration state set, the first transmission configuration state is used to determine the spatial relation of the first reference signal resource after the first time, and wherein on a condition that the first transmission configuration state does not belong to the first transmission configuration state set, the second transmission configuration state is used to determine the spatial relation of the first reference signal resource after the first time.

16. The method according to claim 15, comprising:

transmitting a first information block, or dropping transmitting the first information block, wherein the first information block comprises a reporting for a first reporting configuration, and reference signal resources associated with the first reporting configuration comprise the first reference signal resource, and wherein whether the UE transmits the first information block is related to whether the first transmission configuration state belongs to the first transmission configuration state set, and wherein if on a condition that the first transmission configuration state belongs to the first transmission configuration state set, the UE transmits the first information block, and wherein on a condition that the first transmission configuration state does not belong to the first transmission configuration state set, the UE drops transmitting the first information block.

17. The method according to claim 15, comprising:

transmitting a second information block, the second information block comprising a reporting for a second reporting configuration, wherein reference signal resources associated with the second reporting configuration comprise the first reference signal resource, and whether a measurement performed on the first reference signal resource is used to generate the second information block is related to whether the first transmission configuration state belongs to the first transmission configuration state set, and wherein on a condition that the first transmission configuration state belongs to the first transmission configuration state set, the measurement performed on the first reference signal resource is used to generate the second information block, and wherein on a condition that the first transmission configuration state does not belong to the first transmission configuration state set, the second information block is unrelated to the measurement performed on the first reference signal resource.

18. The method according to claim 15, comprising at least one of the following:

transmitting a first signal, wherein the first signal carries a HARQ-ACK associated with the first signaling, or receiving a second signal, wherein the first signaling comprises scheduling information of the second signal.

19. The method according to claim 15, wherein the first configuration information block indicates M parameter value sets, M being a positive integer greater than 1, and wherein after the first time, a first parameter value set indicates at least one of frequency-domain resources, time-domain resources, density, period or a number of port(s) of the first reference signal resource, and wherein the first parameter value set is related to whether the first transmission configuration state belongs to the first transmission configuration state set, and wherein on a condition that the first transmission configuration state belongs to the first transmission configuration state set, the first transmission configuration state is used to determine the first parameter value set out of the M parameter value sets, and wherein on a condition that the first transmission configuration state does not belong to the first transmission configuration state set, the second transmission configuration state is used to determine the first parameter value set out of the M parameter value sets.

20. The method according to claim 15, comprising:

receiving a second configuration information block, wherein the second configuration information block is used to determine N transmission configuration states, N being a positive integer greater than 1, and wherein the first signaling indicates the first transmission configuration state out of the N transmission configuration states.

* * * * *